United States Patent
Boykiw (12)

(10) Patent No.: US 11,585,539 B2
(45) Date of Patent: *Feb. 21, 2023

(54) KITCHEN APPLIANCE ASSEMBLY AND METHOD OF CONVERTING A KITCHEN HAVING ONE OF A SLIDE-IN AND DROP-IN APPLIANCE TO A KITCHEN HAVING BUILT-IN APPLIANCES

(71) Applicant: Regius Investment Corp., Vancouver (CA)

(72) Inventor: Robert Alan Boykiw, Vancouver (CA)

(73) Assignee: Regius Investment Corp., Vancouver (CA)

( * ) Notice: Subject to any disclaimer, the term of this patent is extended or adjusted under 35 U.S.C. 154(b) by 8 days.

This patent is subject to a terminal disclaimer.

(21) Appl. No.: 17/342,865

(22) Filed: Jun. 9, 2021

(65) Prior Publication Data

US 2021/0293415 A1    Sep. 23, 2021

Related U.S. Application Data

(63) Continuation-in-part of application No. 15/379,308, filed on Dec. 14, 2016, now Pat. No. 11,121,534.

(51) Int. Cl.
    *F24C 15/10*   (2006.01)
    *A47B 77/08*   (2006.01)
    (Continued)

(52) U.S. Cl.
    CPC ............ *F24C 15/106* (2013.01); *A47B 77/08* (2013.01); *F24C 7/062* (2013.01); *F24C 15/08* (2013.01)

(58) Field of Classification Search
    CPC .... H02G 3/18; H02G 3/10; F24C 7/00; A47B 2220/0091
    (Continued)

(56) References Cited

U.S. PATENT DOCUMENTS

| | | | |
|---|---|---|---|
| 1,752,225 A * | 3/1930 | Birchall | H01R 25/006 439/539 |
| 2,985,799 A * | 5/1961 | Steele | B60R 16/06 361/219 |

(Continued)

FOREIGN PATENT DOCUMENTS

| | | |
|---|---|---|
| CN | 104617427 A | 5/2015 |
| CN | 105846224 A | 8/2016 |

OTHER PUBLICATIONS

AC power plugs and sockets, Wikipedia, available online at: https://en.wikipedia.org/w/index.php?title=AC_power_plugs_and_sockets&oldid=693624300 Dec. 3, 2015.

(Continued)

*Primary Examiner* — Dharti H Patel
(74) *Attorney, Agent, or Firm* — Nicholas Garner; Oyen Wiggs Green & Mutala LLP

(57) ABSTRACT

There is provided a method of converting a kitchen having one of the slide-in and the drop-in appliance electrically coupled to a range receptacle, to a kitchen having built-in appliances. The method includes removing the one of the slide-in and the drop-in appliance from the range receptacle. The method includes installing at least two kitchen appliances into at least one of preexisting countertops and cabinetry of the kitchen. Each of the kitchen appliances includes a range plug. The method includes providing a power strip apparatus comprising a range plug and a power strip having a plurality of range sockets electrically coupled to the range plug of the power strip apparatus. The method includes inserting the range plug of the power strip apparatus into the range receptacle and inserting the range plugs of the kitchen appliances into respective ones of the range sockets of the power strip.

20 Claims, 13 Drawing Sheets

(51) Int. Cl.
*F24C 15/08* (2006.01)
*F24C 7/06* (2006.01)

(58) Field of Classification Search
USPC .......................................................... 361/118
See application file for complete search history.

(56) References Cited

U.S. PATENT DOCUMENTS

| | | | |
|---|---|---|---|
| 4,579,403 A | 4/1986 | Byrne | |
| D406,562 S | 3/1999 | Al-Sabah | |
| 6,315,617 B1 | 11/2001 | Al-Sabah | |
| 6,902,429 B1 | 6/2005 | Brooks | |
| 7,554,032 B2 | 6/2009 | Herth | |
| 8,004,811 B2 | 8/2011 | Chen et al. | |
| 11,121,534 B2 * | 9/2021 | Boykiw | F24C 7/00 |
| 2004/0130920 A1 | 7/2004 | Peck et al. | |
| 2004/0190241 A1 | 9/2004 | Cyphers et al. | |
| 2010/0207460 A1 | 8/2010 | Walker et al. | |
| 2010/0285689 A1 | 11/2010 | Cook | |
| 2012/0234594 A1 * | 9/2012 | Peterson | H01R 25/003 174/560 |
| 2013/0063848 A1 * | 3/2013 | Thorpe | F23N 5/242 361/63 |
| 2013/0109205 A1 * | 5/2013 | Oddsen | H01R 25/006 439/106 |
| 2013/0333940 A1 * | 12/2013 | Stencil | H02G 3/18 174/503 |
| 2014/0256187 A1 * | 9/2014 | Myong | H01R 31/02 439/652 |
| 2015/0326020 A1 | 11/2015 | Lichter et al. | |
| 2016/0091119 A1 * | 3/2016 | Sousa | H02G 3/30 29/525.08 |
| 2016/0329654 A1 * | 11/2016 | Pearson | H02G 15/02 |
| 2018/0143677 A1 * | 5/2018 | Gelonese | H04Q 9/00 |

OTHER PUBLICATIONS

Power Strip, Wikipedia, available online at: https://en.wikipedia.org/w/index.php?title=Power_strip&oldid=687119326 Oct. 23, 2015.

* cited by examiner

KITCHEN APPLIANCE ASSEMBLY AND METHOD OF CONVERTING A KITCHEN HAVING ONE OF A SLIDE-IN AND DROP-IN APPLIANCE TO A KITCHEN HAVING BUILT-IN APPLIANCES

BACKGROUND OF THE INVENTION

Field of the Invention

There is provided a kitchen appliance assembly. In particular, there is provided a kitchen appliance assembly, as well as a method of converting a kitchen having one of a slide-in and drop-in appliance to a kitchen having built-in appliances.

Description of the Related Art

The traditional kitchen range receptacle was designed to connect a single kitchen appliance to a high energy circuit. Traditional kitchen appliances are usually moveable appliances known as slide-in or drop-in appliances which plug into a 220-240 volt outlet via a range receptacle.

Built-in kitchen appliances are desirable because they may allow for greater design flexibility, increased user-friendliness and functionality. However, built-in kitchen appliances may require double wiring to the circuit breaker box of the building, with a separate wire, circuit breaker and range receptacle for each built-in appliance, and in some cases may require an upgrade of the circuit breaker box to accept additional circuits. Also, quite often the main breaker box is located a great distance from the existing kitchen wiring. The conversion may thus require costly alterations to the building structure to access and convert the wiring to power built-in appliances. Such a renovation can thus be expensive due to increased electrician costs and increased labor costs associated with removing extensive amounts of wall and thereafter repairing the same. There are also permit, drawing, and related government fees.

There may accordingly be a need for a more cost-effective method of converting a kitchen having one of a slide-in and drop-in appliance to a kitchen having built-in appliances.

BRIEF SUMMARY OF INVENTION

According to one aspect, there is provided a method of converting a kitchen having one of a slide-in and drop-in appliance electrically coupled to a range receptacle, to a kitchen having built-in appliances. The method includes removing the one of the slide-in and the drop-in appliance from the range receptacle. The method includes installing at least two kitchen appliances into at least one of preexisting countertops and cabinetry of the kitchen. Each of the kitchen appliances includes a range plug. The method includes providing a power strip apparatus comprising a range plug and a power strip having a plurality of range sockets electrically coupled to the range plug of the power strip apparatus. The method includes inserting the range plug of the power strip apparatus into the range receptacle and inserting the range plugs of the kitchen appliances into respective ones of the range sockets of the power strip.

According to another aspect, there is provided a kitchen appliance assembly. The assembly includes cabinetry and countertops. The assembly includes at least two kitchen appliances built in to at least one of the cabinetry and the countertop. Each of the kitchen appliances includes a range plug. The assembly includes a range receptacle electrically coupled to an electrical power supply. The assembly includes a power strip apparatus. The power strip includes a range plug and a power strip. The power strip includes a plurality of range sockets electrically coupled to the range plug of the power strip apparatus. The range plug of the power strip apparatus is inserted within a range receptacle and the range plugs of the kitchen appliances are inserted into the range sockets.

According to a further aspect, there is provided a power strip apparatus. The apparatus includes a flexible electrical cable having a proximal end and a distal end. The apparatus includes a range plug electrically connected to the distal end of the electrical cable. The apparatus includes a hollow housing coupled to the proximal end of the electrical cable. The apparatus includes three electrical sockets mounted to the housing. The sockets electrically connect together in series with the range plug. A first said socket and a second said socket align with each other. A third said socket is between and offset at least in part from the first said socket and the second said socket. This may promote a compact design on the one hand, while still complying with safety electrical standards.

According to yet another aspect, there is provided a power strip apparatus. The apparatus includes a flexible electrical cable having a proximal end and a distal end. The apparatus includes a range plug electrically connected to the distal end of the electrical cable. The apparatus includes a hollow housing coupled to the proximal end of the electrical cable. The apparatus includes a plurality of electrical sockets mounted to the housing. The sockets electrically connect together in series with the range plug. The apparatus includes a metal, flexible cable protector within which the cable extends. The cable protector extends between and couples to the housing and the range plug.

There is additionally provided a method of creating a kitchen with built-in kitchen appliances. The method includes removing an existing slide-in or drop-in range from a space of the kitchen having a range receptacle. The method includes installing a power strip apparatus including a range plug coupled to the range receptacle of the kitchen and a plurality of range sockets coupled to the range plug. The method includes installing two or more built-in appliances in the kitchen. The step of installing the two or more built-in appliances includes both installing cabinetry and at least one said built-in appliance within the now open space of the kitchen and enclosing the power strip apparatus via the cabinetry and the at least one said built-in appliance. The method includes coupling sockets of the two or more built-in appliances to respective said range sockets of the power strip apparatus, with power being provided to the two or more built-in appliances thereby.

There is further provided a method of creating a more energy-efficient kitchen in a cost-effective manner. The method includes removing a slide-in/drop-in appliance from a range receptacle of the kitchen, the range receptacle connecting to the electrical circuit. The method includes selecting two or more energy efficient kitchen appliances and installing the two or more energy-efficient in the kitchen. The method includes connecting the two or more energy efficient kitchen appliances to the electrical circuit via a power strip apparatus with a plurality of range sockets to which range plugs of the two or more energy efficient kitchen appliances respectively couple. The power strip apparatus includes a range plug via which the range sockets thereof couple to the range receptacle of the kitchen. The two or more energy efficient kitchen appliances are selected such that the maximum combined amperage draws thereof is equal to or less than the amperage at which the electrical circuit is rated.

There is also provided a power strip apparatus via which a plurality of built-in kitchen appliances couple to a range receptacle of a kitchen. The power strip apparatus includes a flexible electrical cable having a proximal end and a distal end. The power strip apparatus includes a range plug electrically connected to the distal end of the flexible electrical cable and configured to couple with the range receptacle of the kitchen. The power strip apparatus includes a hollow housing coupled to the proximal end of the flexible electrical cable. The power strip apparatus includes a plurality of electrical sockets mounted to the housing. The electrical sockets electrically connects with the range plug and is configured to receive plugs from respective ones of the built-in kitchen appliances. The power strip apparatus includes a flexible cable protector within which the flexible electrical cable extends. The flexible cable protector extends between and couples to the housing and the range plug. The power strip apparatus is configured to be enclosed by either (i) cabinetry and at least one of the built-in kitchen appliances or (ii) two or more of the built-in kitchen appliances, with access thereto thereby being inhibited.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
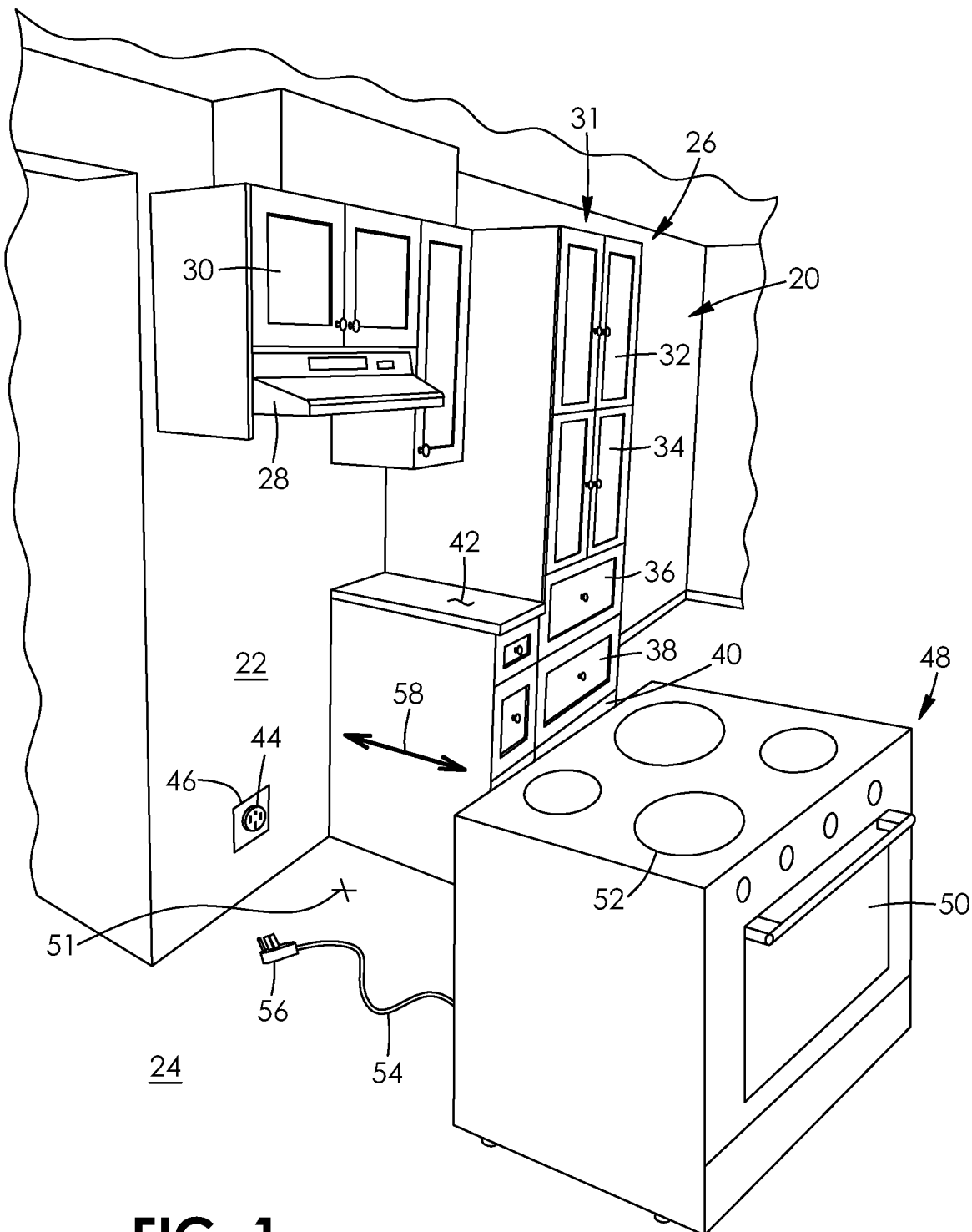
FIG. 1 is a front perspective view of a building with a kitchen appliance assembly according to the prior art, the building being shown partially in fragment and the kitchen appliance assembly including one of a slide-in and drop-in appliance in the form of a slide-in electric range.

Referring to the drawings and first to FIG. 1, there is shown a building 20. The building includes a floor 22 and a wall 24 coupled to and extending upwards from the floor.

The building 20 includes a kitchen appliance assembly 26 according to the known prior art. The kitchen appliance assembly includes a vent 28 with cabinetry 30 adjacent thereto. The kitchen appliance assembly 26 further includes in this example a column of cabinetry 31 comprising upper cabinets 32 and 34 and a lower drawers 36, 38 and 40. The kitchen appliance assembly includes a countertop 42 positioned adjacent to drawer 36 in this example.

The kitchen appliance assembly includes a range receptacle 44 mounted to the wall 24 of the building 20 via a mounting plate 46. The range receptacle is a standard 14/50 receptacle in this example.

The kitchen appliance assembly 26 includes one of a slide-in and drop-in appliance, in this example a slide-in electric range 48 within a space 51. The range includes an oven 50 and a stovetop 52 combined as one unit and may thus be referred to as a combination oven and cooktop. The range includes a flexible electrical cable 54 and a range plug 56 coupled to the cable. The range plug of the range is shaped to be inserted into the range receptacle 44. The range 48 may thereafter slide into place, as shown by arrows of numeral 58, such that the range abuts wall 24, is positioned adjacent to countertop 42 and below vent 28 in this example. Drop-in and slide-in electric ranges, including their various parts and functions, are known to those skilled in the art and therefor range 48 will not be described in further detail.

FIGS. 2 to 9 show a kitchen appliance assembly 26.1 for building 20 which has been converted from a kitchen appliance assembly 26 configured to receive one of a slide-in and drop-in appliance seen in FIG. 1 to a kitchen appliance assembly 26.1 having two or more built-in energy-efficient kitchen appliances integrally built in to at least one of the cabinetry and the countertop. Like parts have like numbers and functions as the kitchen appliance assembly 26 shown in FIG. 1 with the addition of decimal extension "0.1". Kitchen appliance assembly 26.1 is the same as described for kitchen appliance assembly 26 shown in FIG. 1 with the following exceptions.

Figure 5:
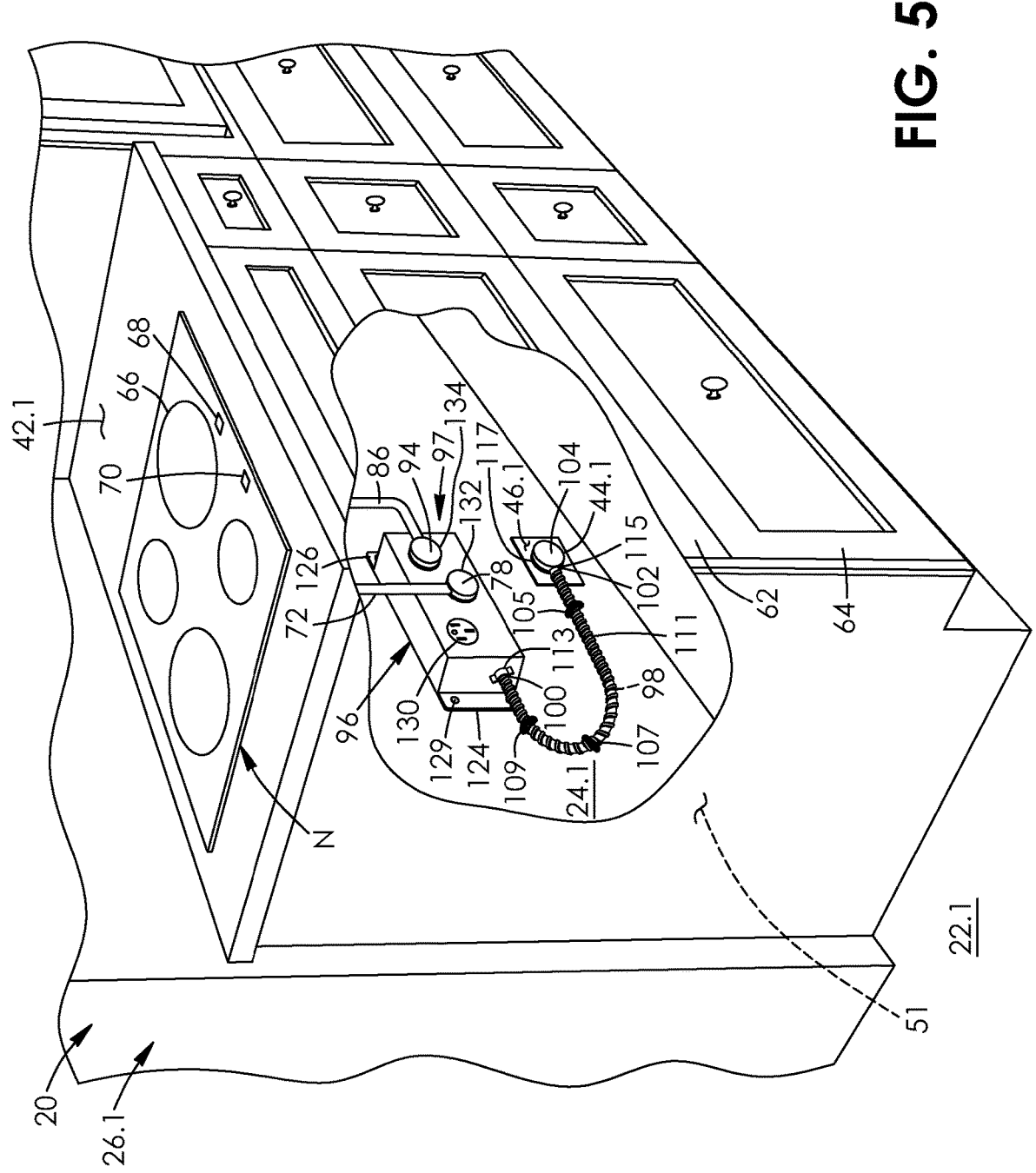
FIG. 5 is an enlarged, fragmentary front perspective view of the building of FIG. 2, with part of the cabinetry being removed to reveal a range receptacle, a range plug of the cooktop of FIG. 3, a range plug of the oven of FIG. 4, and a power strip apparatus of the kitchen appliance assembly of FIG. 2, the power strip apparatus including a power strip shown mounted to the wall of the building, the range plugs of the cooktop and oven being shown inserted into sockets of the power strip and a range plug of the power strip apparatus being shown inserted into the range receptacle.
Figure 7:
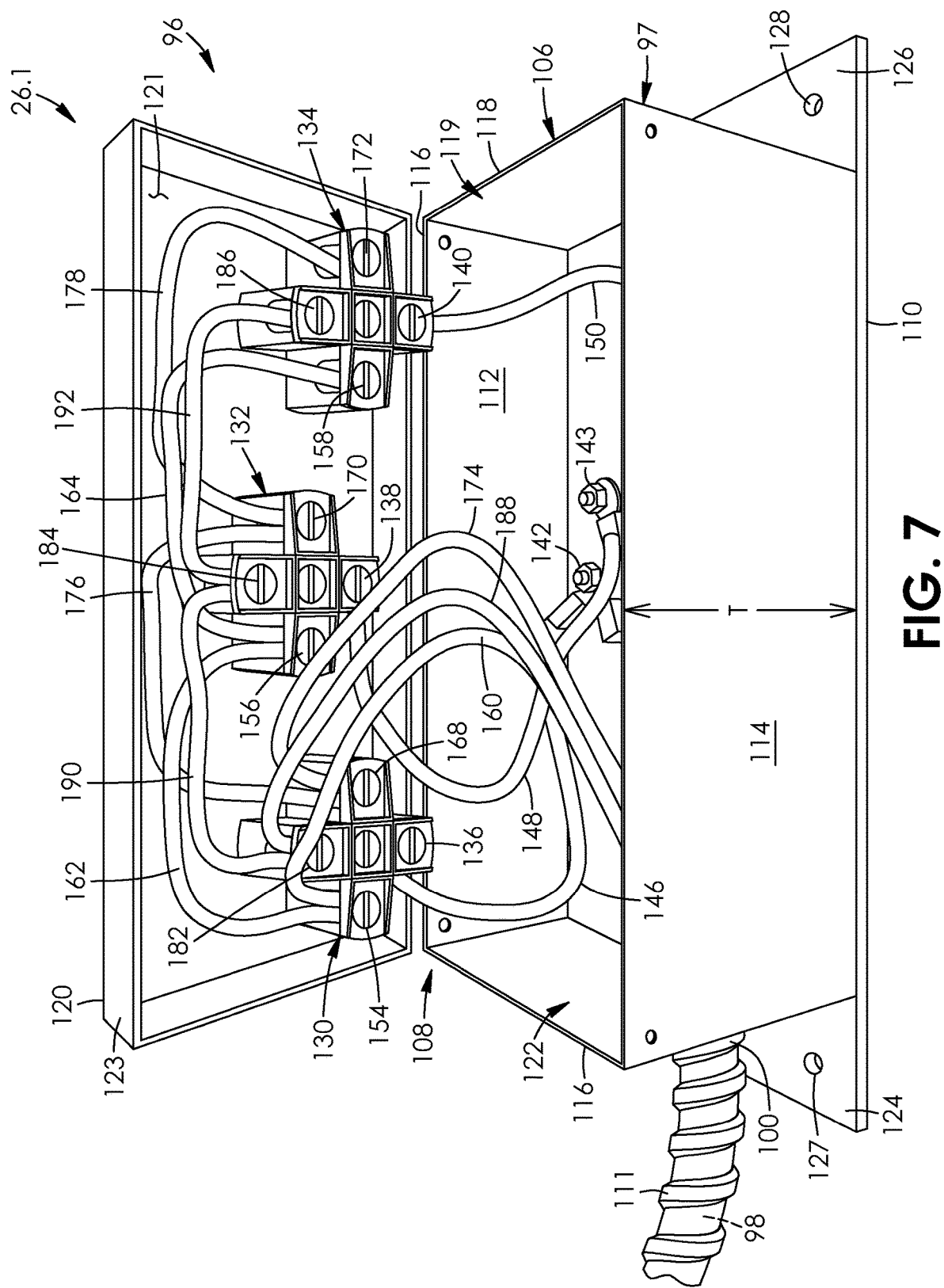
FIG. 7 is a side perspective view of the power strip apparatus of FIG. 6, the power strip apparatus being shown in fragment with the cover of the housing being shown partially removed to reveal the interior of the housing.

As seen in FIG. 5, the kitchen appliance assembly 26.1 includes a power strip apparatus 96. The power strip apparatus includes a power strip 97. The power strip in this example is configured to comply with commercial cooking appliances standards CSA C22.2 No. 109 (R2013) and UL 197. The power strip apparatus includes a flexible electrical cable 98 having a proximal end 100 and a distal end 102. The power strip apparatus 96 includes a metal, flexible cable protector 111 within which the cable extends. The cable protector has a proximal end 113 and a distal end 115. As seen in FIG. 7, the power strip apparatus 96 includes a plug for a range receptacle, in this example a range plug 104 electrically connected to the distal end 102 of the electrical cable 98. The cable protector 111 couples to the housing 117 of the range plug via its end 115. The cable protector is mounted to the wall 22.1 of the building 20 via fasteners, in this example u-shaped cable fasteners 105, 107 and 109.

Figure 9:
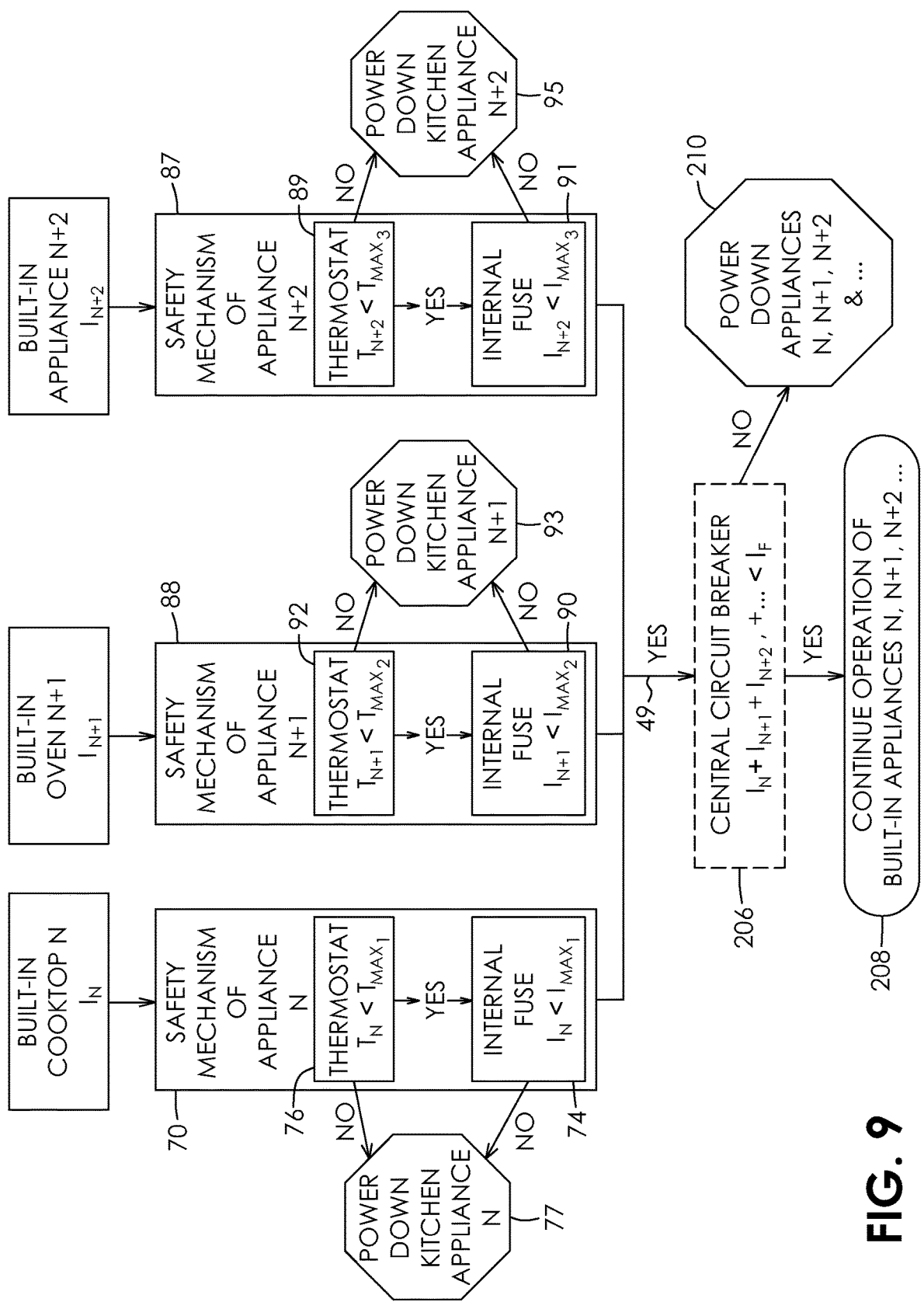
FIG. 9 is a flowchart of the operation of the kitchen appliance assembly of FIG. 2.

As shown in FIG. 5, the range plug 104 of the power strip apparatus 96 is insertable into the range receptacle 44.1. The range receptacle is electrically coupled to an electrical power supply (not shown) via cable 49. As seen in FIG. 9, the building 20 includes an in-line and in this example central circuit breaker 206 electrically coupled to the cable 49 and located between the range receptacle 44.1 and the power supply.

The power strip 97 includes a hollow housing 106 in this example made of metal plate. The housing is a hollow rectangular prism in shape in this example. The housing 106 has a front 108 seen in FIG. 6, a rear 110 seen in FIG. 7, a pair of spaced-apart ends 112 and 114 seen in FIG. 6, and a pair of spaced-apart sides 116 and 118 seen in FIG. 6 that extend between said ends thereof. The front and rear of the housing are rectangular and extend between the ends and the sides of the housing. The front 108 and the rear 110 of the housing 106 are similar in size and larger than the sides 116 and 118 and the ends 112 and 114 of the housing in this example.

Figure 6:
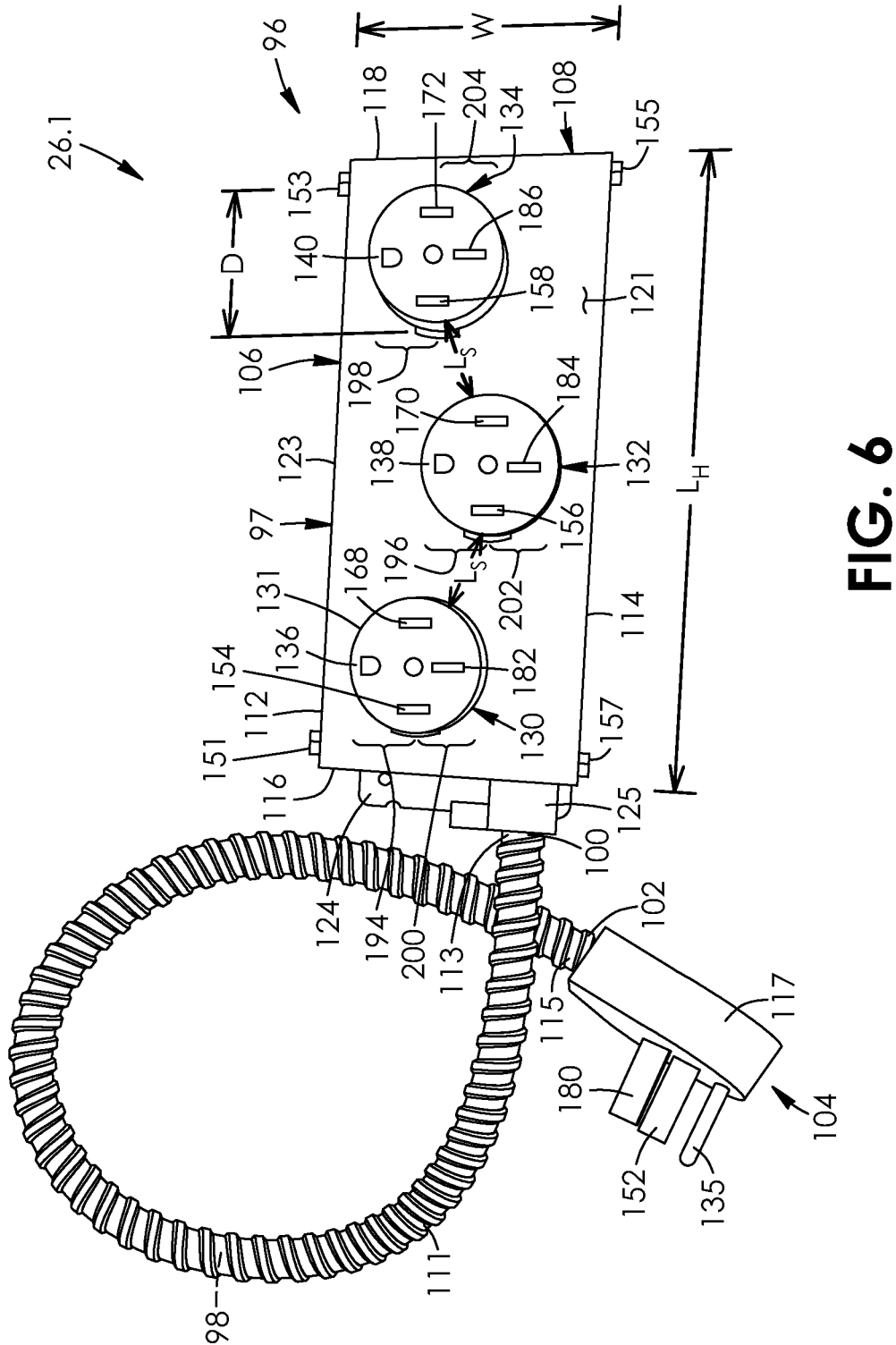
FIG. 6 is a front perspective view of the power strip of FIG. 5, the power strip apparatus including a housing, with a removable cover thereof shown coupled to the housing.

As seen in FIG. 6, the proximal end 113 of the cable protector 111 couples to and extends from side 116 of the housing 106 via a hose coupling member 125 at a location adjacent to end 114 in this example. As seen in FIG. 7, the cable protector extends from the housing adjacent to the rear 110 of the housing in this example.

The housing 106 includes a removable cover 120 aligned with the front 108 thereof and which is selectively removable to reveal the interior 122 of the housing of the power strip 97. The cover is shaped to extend about the open top 119 of the housing. The cover 120 includes a planar member in this example a rectangular plate 121 which aligns with the front 108 of the housing 106 when the cover is fitted in place as seen in FIG. 6. The cover includes a peripheral portion 123 which couples to and extends outwards from plate 121. The peripheral portion of the cover extends about and abuts the sides 116 and 118 and the ends 114 and 116 of the housing when the cover is positioned in place.

As seen in FIG. 6, the power strip apparatus 96 includes a plurality of fasteners, in this example metal screws 151, 153, 155 and 157 which selectively extend through the peripheral portion 123 of the cover and at least one of the sides and the ends of the housing. In this example, the fasteners extend through the peripheral portion of the cover and into the ends 112 and 114 of the housing 106 at locations adjacent to the sides 116 and 118 of housing. The fasteners 151, 153, 155 and 157 securely couple the cover to the sides and the ends of the housing thereby.

As seen in FIG. 7, the power strip apparatus 96 includes a pair of mounting members, in this example in the form of mounting plates 124 and 126 which extend along the rear 110 of the housing of the power strip 97. Mounting plate 124 couples to and extends outwards from side 116 of the housing 106 in this example. Cable protector 111 couples to the housing 106 adjacent to mounting plate 124 in this example. Mounting plate 126 couples to and extends from side 118 of the housing in this example. Each mounting plate has at least one aperture extending therethrough. This is seen in FIG. 7 by fastener apertures 127 and 128 extending through mounting plates 124 and 126. As seen in FIG. 5, the power strip 97 is connectable to wall 22.1 via fasteners 129 which extend through the fastener apertures of the mounting plates in this example.

Referring to FIG. 6, the power strip 97 includes a plurality of electrical range sockets, in this example three range sockets 130, 132 and 134 electrically coupled to the range plug 104. However, this number of sockets is not strictly required and there may be as few as two, or more than three in other embodiments. The electrical sockets mount to and partially extend through circular apertures 131 of the planar member 121 of the cover 120 in this example. The cover 120 may thus be referred to as a removable front to which the electrical sockets 130, 132 and 134 are mounted.

As seen in FIG. 6, socket 130 is adjacent to end 112 of the housing 106 and is adjacent to side 116 of the housing in this example. Socket 134 is adjacent to end 112 of the housing and is adjacent to side 118 of the housing in this example. Sockets 130 and 134 align with each other in this example, and socket 132 is between and offset at least in part from sockets 130 and 134 in this example. Sockets 130, 132, and 134 have first half portions 194, 196 and 198, respectively, and second half portions 200, 202 and 204, respectively. In this case, the first half portion 196 of socket 132 aligns with both the second half portion 200 of socket 130 and the second half portion 204 of socket 134. Socket 132 is adjacent to end 114 of the housing 106 and is between the sides 116 and 118 of the housing. Socket 132 in this example is halfway between the sides 116 and 118 of the housing.

Referring to FIG. 6, each of the electrical sockets has a cross-sectional diameter, as shown by diameter D for socket 134. Adjacent ones of the sockets, namely sockets 130 and 132, and sockets 132 and 134, are spaced from each other by a distance L which is equal to or greater than one half of said diameter D in this example.

The width W of the housing 106 extending between ends 112 and 114 is preferably in the range of equal to or greater than two times said diameter D and equal to or less than three times said diameter D, in this example. More preferably, the width W of the housing 106 is generally equal to two times said diameter according to one embodiment.

The length L of the housing extending between sides 116 and 118 is preferably equal to greater than four times said diameter for a housing having three sockets 130, 132 and 134. The length of the housing is generally equal to about five times said diameter in this example.

Referring to FIG. 7, the thickness T of the housing 106 extending between the front 108 and rear 110 of the housing is in the range of equal to or greater than said diameter D and equal to or less than two times said diameter D, in this example.

Figure 8:
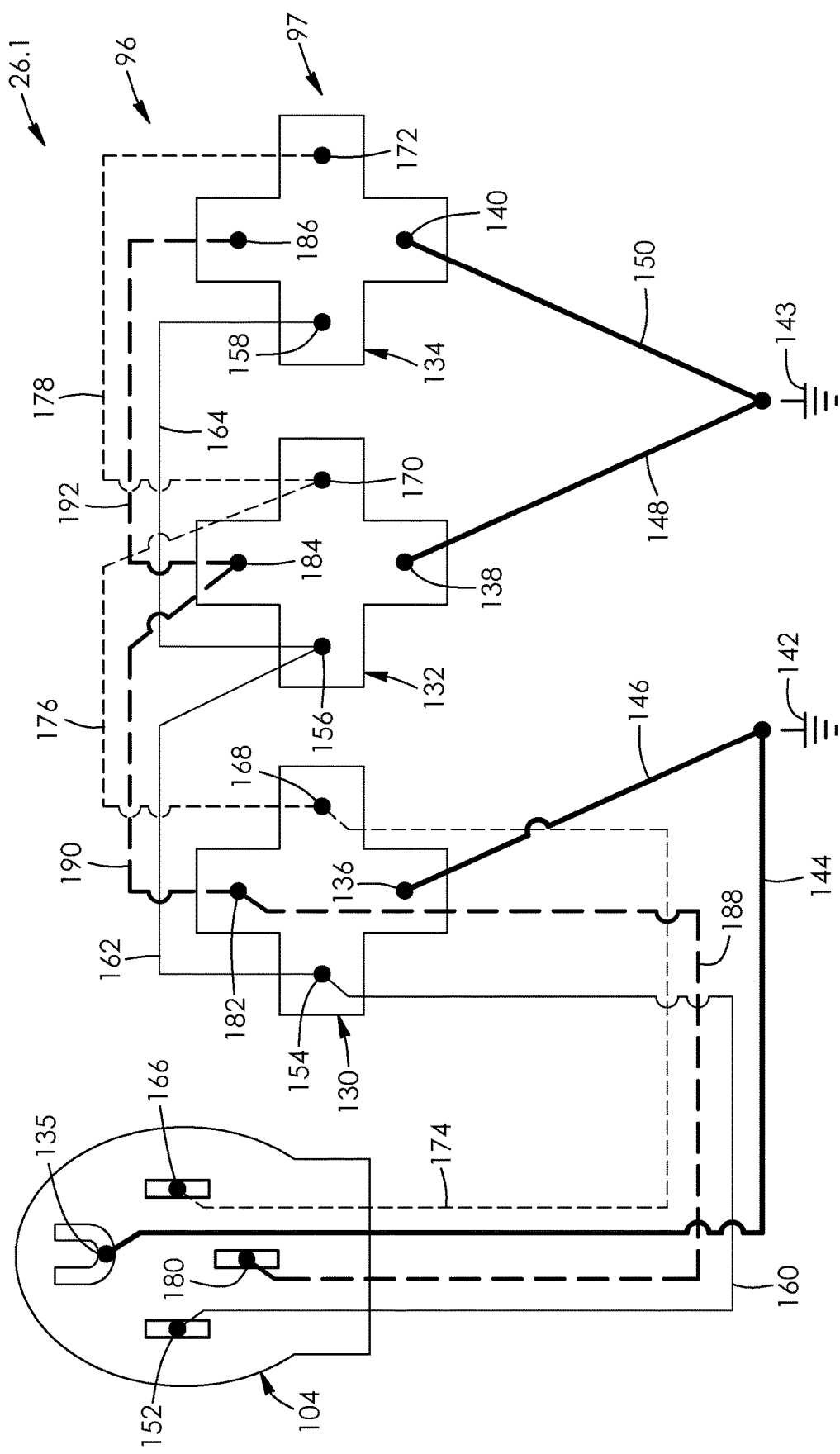
FIG. 8 is a schematic wiring diagram of the power strip apparatus of FIG. 6.

As seen in FIG. 8, range plug 104 and sockets 130, 132 and 134 include first electrical terminals, in this example ground terminals 135, 136, 138 and 140 coupled to ground 142 and 143 via conduits, in this example wires 144 and 146, and 148 and 150, respectively. The range plug 104 and sockets 130, 132 and 134 include second electrical terminals 152, 154, 156 and 158 coupled together in series via conduits, in this example wires 160, 162 and 164, respectively. The range plug 104 and sockets 130, 132 and 134 include third electrical terminals 166, 168, 170 and 172 coupled together in series via conduits, in this example wires 174, 176 and 178, respectively. The range plug 104 and sockets 130, 132 and 134 include fourth electrical terminals 180, 182, 184 and 186, respectively, coupled together in series via conduits, in this example wires 188, 190 and 192, respectively.

Figure 2:
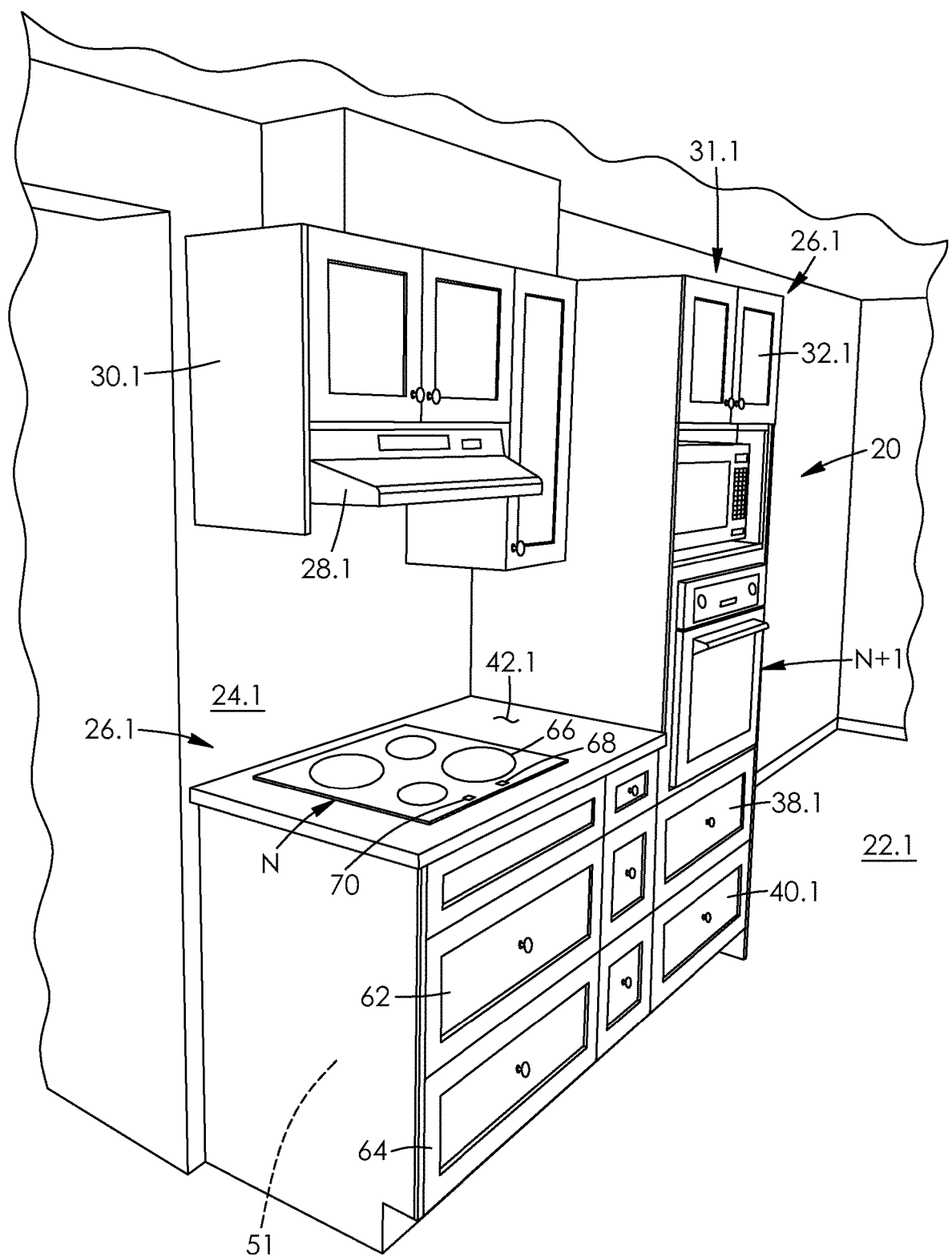
FIG. 2 is a front perspective view of the building of FIG. 1 with a kitchen appliance assembly according to a first aspect, the building being shown partially in fragment and the kitchen appliance assembly including two built-in kitchen appliances in the form of a built-in cooktop and a built-in oven spaced-apart from the cooktop.

As seen in FIG. 2, the kitchen appliance assembly 26.1 includes a plurality of built-in kitchen appliances, in this example including a first energy-efficient kitchen appliance in the form of an energy-efficient cooktop N integrally built into countertop 42.1. The kitchen appliance assembly 26.1 further includes an additional cabinetry below the cooktop in the form of lower drawers 62 and 64. The cooktop N and lower drawers replace range 48 seen in FIG. 1. As seen in FIG. 5, countertop 42.1 and drawers 62 and 64 enclose the power strip 97 and inhibit access thereto. Also, the countertop, power strip and drawers are now positioned with space 51 created by removing traditional range 48 seen in FIG. 1.

Figure 3:
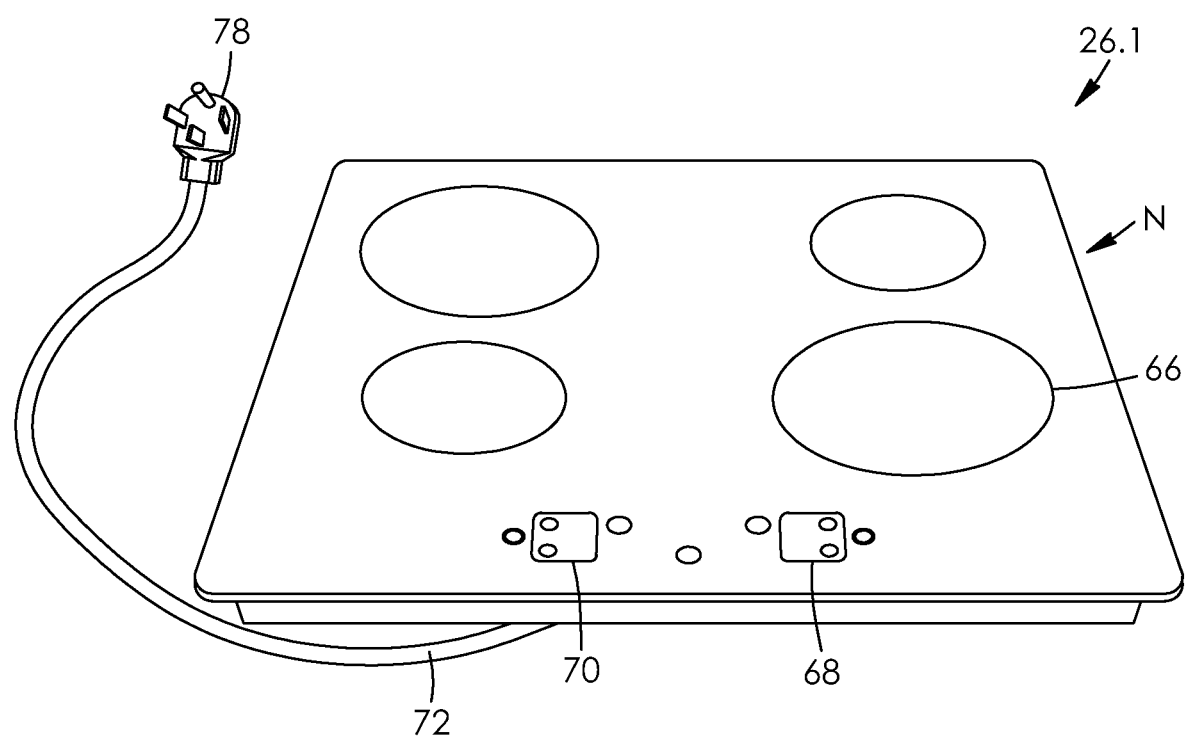
FIG. 3 is a front, top perspective view of the cooktop of the kitchen appliance assembly of FIG. 2.

As seen in FIG. 3, the cooktop includes a plurality of heating elements 66 for cooking items enclosed within pots (not shown) for example. Each of the heating elements provides a maximum temperature thereon in operation, with a given temperature of the heating elements being shown as $T_N$ in FIG. 9. Referring back to FIG. 3, the cooktop N includes actuator buttons 68 operatively connected to the heating elements. The actuator buttons selectively turn the heating elements on or off and adjusting the amount of heat emitted from the heating elements. The built-in cooktop to this stage is conventional, with its parts and functionings being known to those skilled in the art.

Referring to FIG. 9, the cooktop draws a given current amperage $I_N$ and has a current rating $I_{MAX1}$, which is equal to a maximum threshold amount of current drawn to be drawn by the cooktop. The amperage range is from 0.5 amps to 29 amps with use of a short-timed boost cycle, special heat lift up, according to one example.

Referring to FIG. 3, the cooktop N further includes a safety mechanism 70 and electrical circuitry 72. As seen in FIG. 9, the safety mechanism 70 includes a thermostat 76 in this example operatively connected to the heating elements 66 of the cooktop seen in FIG. 3. Referring back to FIG. 9, the thermostat is configured to automatically regulate the temperature of the heating elements $T_N$, with the thermostat periodically powering down the heating elements, as seen by box 77 in FIG. 9, and automatically-resetting upon detecting a maximum temperature of the heating elements of $T_{MAX1}$.

Referring to FIG. 3, two of the heating elements of the cooktop may be controlled by a relay, triac and thermostat, and the other two of the heating elements may be controlled by a relay and thermostat in this example. According to another aspect, if the inner housing temperature of the cooktop N is above a set threshold, such as 200 degrees Celsius, then thermostat is configured to automatically switch off to protect the cooktop. After the inside of the cooktop has cooled down, the thermostat is configured to enable the cooktop to operate once more.

As seen in FIG. 9, the safety mechanism further includes at least one of an internal fuse and a circuit breaker for each heating element 66, in this example shown by internal fuse 74. If the thermostat is broken and the cooktop N is overheating, the fuse functions to shut off the power supply to the given heating element of the cooktop. The fuse may be configured such that it melts upon the current drawn through the electrical circuitry of the cooktop reaching a maximum threshold, with the current level at which the fuse melts being $I_{MAX1}$. The overtop N is powered down upon the fuse 74 melting, as shown by box 77 in FIG. 9.

As seen in FIG. 3, the cooktop N includes a plug for a range receptacle, in this example a range plug 78 electrically connected to the electrical circuitry 72 thereof. As seen in FIG. 5, any of the sockets, and in this example socket 132 of the power strip 97 is shaped to receive range plug 78 of cooktop N seen in FIG. 3.

Referring to FIG. 2, the plurality of built-in, energy-efficient kitchen appliances of kitchen appliance assembly 26.1 includes a second energy-efficient kitchen appliance, in this example an energy-efficient oven N+1. The oven is positioned at a location spaced-apart from the cooktop N in this example. The oven N+1 in this example is integrally installed within or built into the column of cabinetry 31, with the oven taking the place of cabinet 34 and drawer 36 of the kitchen appliance assembly 26 seen in FIG. 1.

Figure 4:
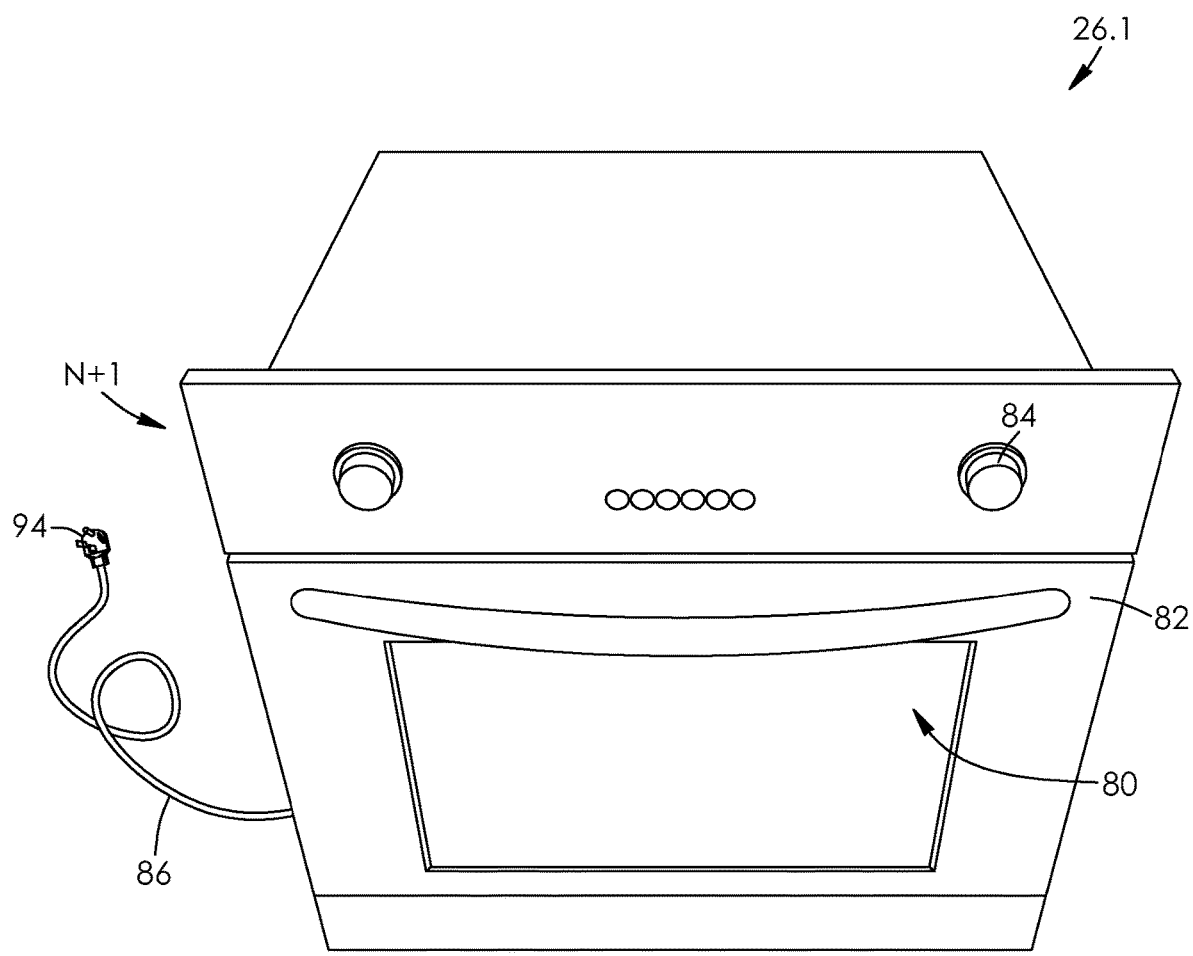
FIG. 4 is a front, top perspective view of the oven of the kitchen appliance assembly of FIG. 2.

As seen in FIG. 4, the oven N+1 includes an enclosed heating element 80 that is selectively accessible via a hinge oven door 82. The oven N+1 includes actuator buttons 84 operatively connected to the heating element. The actuator buttons selectively turn the heating element on or off and adjusting the amount of heat emitted from the heating element. The built-in oven to this stage is conventional, with its parts and functionings being known to those skilled in the art.

Referring to FIG. 9, the oven N+1 draws a given current amperage $I_{N+1}$ and has a current rating $I_{MAX2}$, which is equal to a maximum threshold amount of current drawn to be drawn by the oven. The amperage range of the oven may be 5 amps to 10.5 amps according to one example.

Referring to FIG. 4, the oven N+1 further includes electrical circuitry 86 and, as seen in FIG. 9, a safety mechanism 88. The safety mechanism 88 of the oven includes a thermostat 92 in this example operatively connected to the heating element 80 of the oven seen in FIG. 4. Referring back to FIG. 9, the thermostat is configured to automatically regulate the temperature $T_{N+1}$ of the heating element, with the thermostat periodically powering down the heating element, as seen by box 93 in FIG. 9, and automatically-resetting upon detecting a maximum temperature of the heating elements of $T_{MAX2}$. After the oven has cooled down, the thermostat 92 enables the oven to operate once more.

Referring to FIG. 9, the safety mechanism further includes one of an internal fuse and circuit breaker, in this example internal thermal fuse 90. If the thermostat 92 is broken and the oven is overheating, the fuse functions to shut off the power supply to the oven. The fuse is configured such that it melts upon the current drawn through the electrical circuitry of the oven N+1 reaching a maximum threshold, with the current level at which the fuse melts being $I_{MAX2}$. The oven is powered down upon the fuse 90 melting, as shown by box 93 in FIG. 9.

Referring to FIG. 4, the oven N+1 includes a plug for a range receptacle, in this example a range plug 94 electrically connected to the electrical circuitry 86 thereof. As seen in FIG. 5, any of the sockets, and in this example socket 134 is shaped to receiving range plug 94 of oven N+1 seen in FIG. 4.

As seen in FIG. 9, the plurality of built-in, energy-efficient kitchen appliances of kitchen appliance assembly 26.1 may include additional energy-efficient kitchen appliances, in this example shown by built-in appliance N+2. The appliance includes a safety mechanism 87 in the form of a thermostat 89 in this example operatively connected to the heating element of the appliance. The thermostat is configured to automatically regulate the temperature $T_{N+2}$ of the heating element, with the thermostat periodically powering down the heating element, as seen by box 95 in FIG. 9, and automatically-resetting upon detecting a maximum temperature of the heating elements of $T_{MAX3}$. After the appliance N+2 has cooled down, the thermostat 89 enables the oven to operate once more.

The appliance draws a given current amperage $I_{N+2}$ and has a current rating $I_{MAX3}$, which is equal to a maximum threshold amount of current drawn to be drawn by the oven. The appliance N+2 further includes an internal breaker or fuse, in this example fuse 89 which melts upon the current $I_{N+2}$ drawn through the appliance reaching a maximum threshold, with the current level at which the fuse melts being $I_{MAX3}$. The appliance is powered down upon the fuse 89 melting, as shown by box 95 in FIG. 9.

In operation and referring to FIG. 9, electrical power is supplied to the heating elements of the cooktop N, oven N+1 and appliance N+2 to performing cooking tasks and the like. The fuses 74, 90 and 89 of the safety mechanisms 70, 88 and 87 of the built-in appliances determine whether the current amperage $I_N$, $I_{N+1}$ and $I_{N+2}$ drawn from the appliances is larger than the maximum current rating $I_{MAX1}$, $I_{MAX2}$ and $I_{MAX3}$ of the fuses, respectively. If so, respective ones of the fuses melt and said respective one of the appliances N, N+1 and N+2 is powered down as shown by boxes of numerals 77, 93 and 95.

If the current levels are determined to be below the above mentioned maximum thresholds, each of the safety mechanisms 70, 88 and 87 may also employ thermostats 76, 92 and 89 which automatically power down the respective heating elements of the appliances, as shown by boxes of numerals 77, 93 and 95, upon the temperatures $T_N$, $T_{N+1}$ and $T_{N+2}$ thereof reaching maximum threshold temperatures $T_{MAX1}$, $T_{MAX2}$ and $T_{MAX3}$. This temperature threshold may be configured to vary from one appliance to another.

If the detected temperatures on the heating elements of the cooktop N, oven N+1 and appliance N+2 are below the pre-set thresholds, as a third level of safety, the built-in kitchen appliances of kitchen appliance assembly 26.1 are selected such that the collective current amperage thereof is equal to or less than that of a maximum collective amperage threshold, which in this example is equal to that of the current rating $I_F$ of breaker 206. If the current detected from the sum of the currents $I_N+I_{N+1}+I_{N+2}$ . . . etc. drawn from appliances N, N+1, N+2 etc. collectively is less than the current rating or amperage or amperage $I_F$ of breaker 206, the cooktop N, oven N+1 and appliance N+2 may continue to operate, as shown by box 208 in FIG. 9. If the collective current drawn exceeds $I_F$, the circuit breaker 206 trips causing the appliances N, N+1, N+2 etc. to power drawn, as shown by box 210.

Herein described therefor is a method of converting a kitchen having one of a slide-in and drop-in appliance electrically coupled to a range receptacle, as shown by kitchen appliance assembly 26 in FIG. 1 having slide-in electric range 48 connectable to range receptacle 44, to a kitchen having built-in appliances, as shown by kitchen appliance assembly 26.1 seen in FIG. 2 with built-in cooktop N and oven N+1.

The method includes removing the slide-in electric range seen in FIG. 1 from the range receptacle. As seen in FIG. 5, the method includes providing power strip apparatus 96 which includes its power strip 97, range plug 104 and range sockets 130, 132 and 134 electrically coupled to its range plug. The method includes mounting the power strip 97 to the wall 22.1 of the building. The method includes inserting the range plug 104 of the power strip into the range receptacle 44.1.

As seen in FIG. 2, the method includes integrally installing the cooktop N, oven N+1 and appliance N+2 within the cabinetry of the kitchen appliance assembly 26.1. Referring to FIG. 9, the method includes configuring the built-in appliances N, N+1 and N+2 such that maximum collective power consumption thereof is equal to or less than that of the maximum threshold of power that the electrical circuit can provide. The method further includes selecting the kitchen appliances to be built-in such that the collective current rating thereof is equal to or less than that one of an in-line circuit breaker or fuse, in this example breaker 206 seen in FIG. 9.

As seen in FIG. 5, the method includes inserting the range plugs 78 and 94 of the cooktop N and oven N+1 seen in FIG. 2 into respective ones of the range sockets 132 and 134 of the power strip 97.

Referring to FIG. 9, the method includes providing each of the two kitchen appliances with safety mechanisms 70, 88 and 89. Each safety mechanism causes its respective one of the kitchen appliances to selectively depower upon a current-consumption threshold being reached. The method may further include incorporating thermostats 76, 92 and 89 with the safety mechanisms 70, 88 and 87 as a second level of safety to selectively depower the appliances N, N+1 and N+2 upon maximum threshold temperatures of the heating elements of the appliances being reached.

The method may further include as a third level of safety incorporating an in-line circuit breaker to collectively depower the appliances N, N+1 and N+2 upon detecting that the collective current drawn therefrom exceeds a maximum current rating of the breaker.

Figure 10:
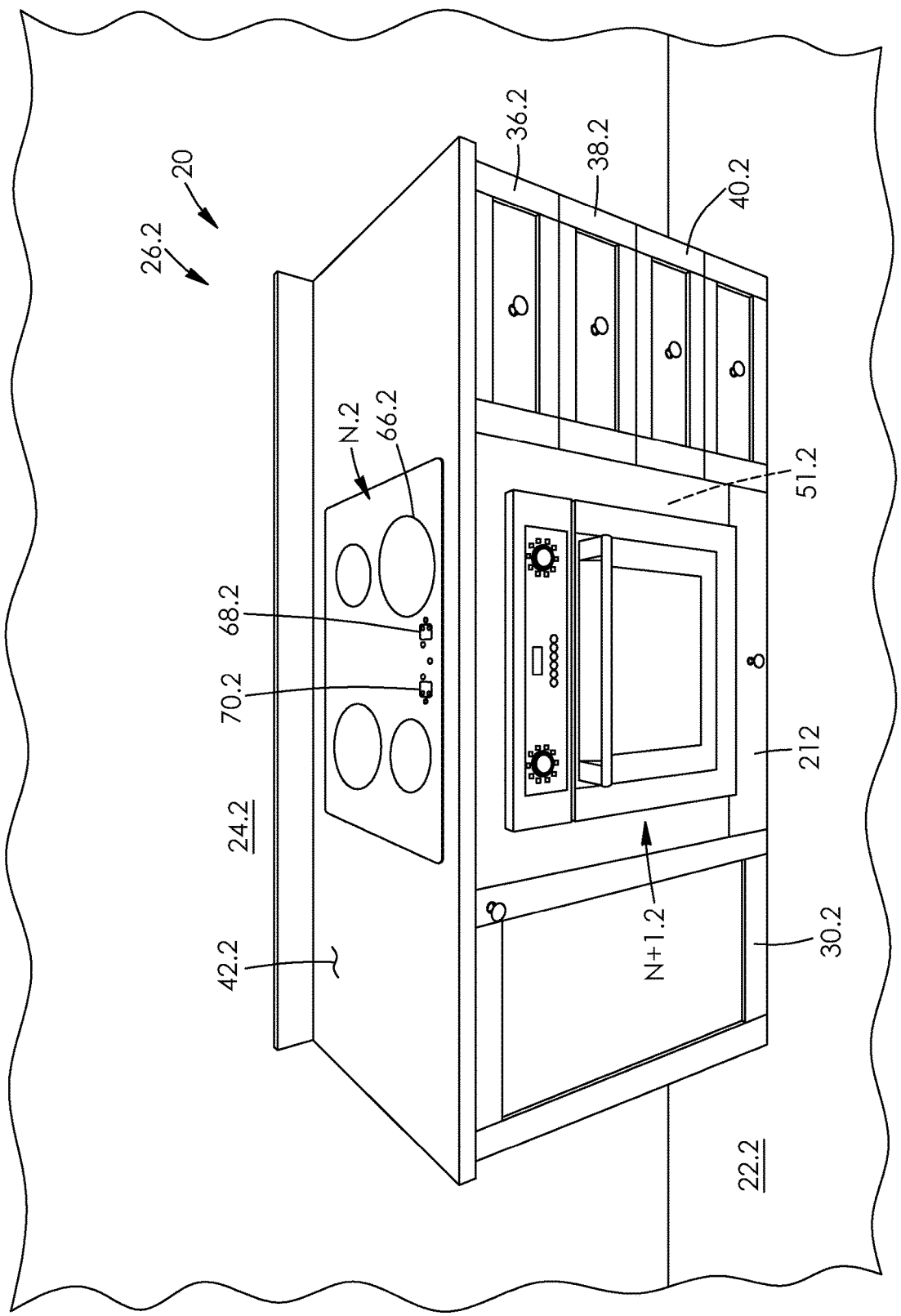
FIG. 10 is a front perspective view of a building with a kitchen appliance assembly according to a second aspect, the building being shown in fragment and the kitchen appliance assembly including two built-in kitchen appliances in the form of a built-in cooktop and a built-in oven aligned with the cooktop.
Figure 11:
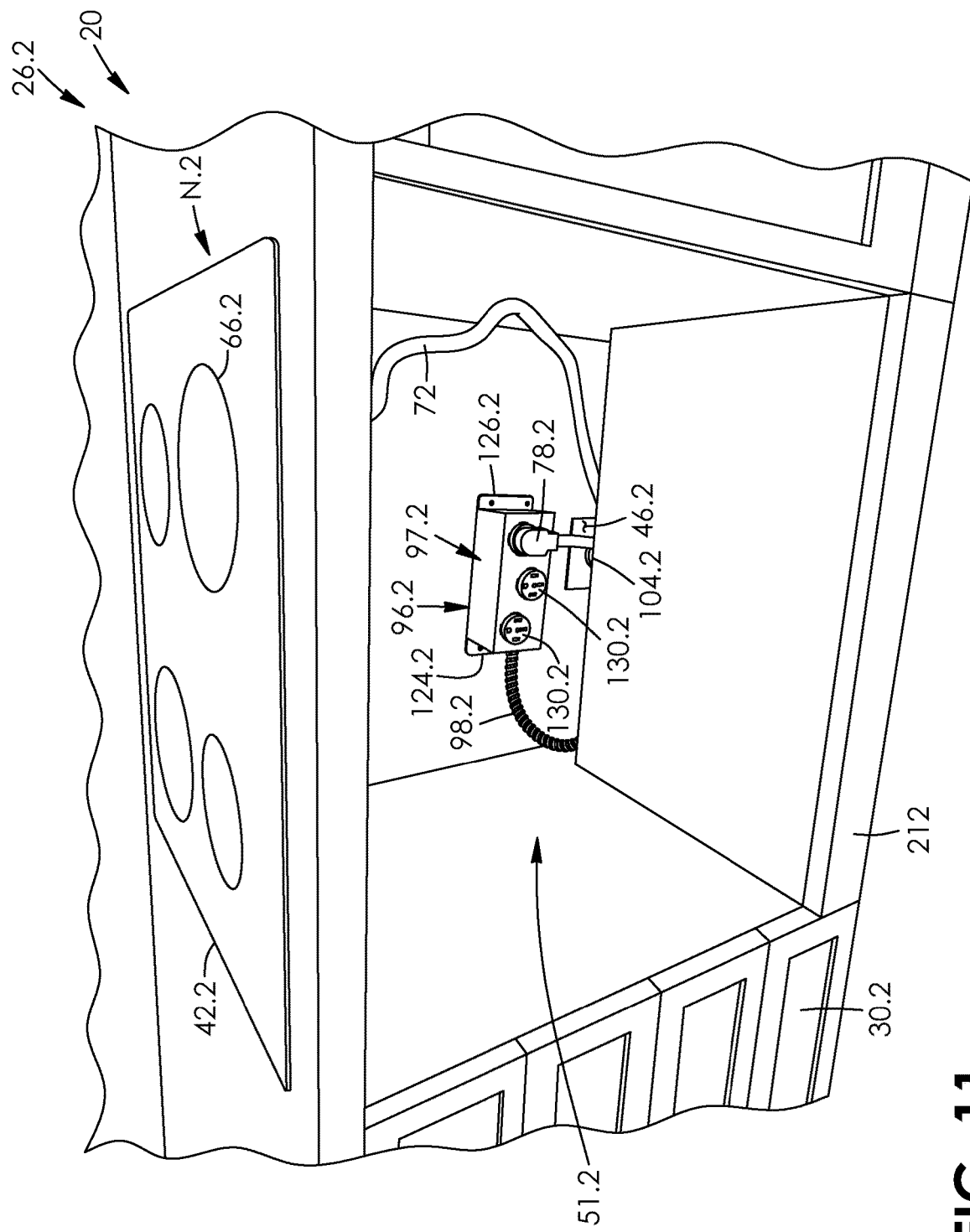
FIG. 11 is an enlarged, fragmentary, front perspective view of the building of FIG. 10, with the built-in oven being removed to reveal a power strip apparatus of the kitchen appliance assembly, the apparatus including a power strip shown mounted to the wall of the building behind the location of the built-in oven, with the range plug of the cooktop being shown inserted into a socket of the power strip and a range plug of the power strip apparatus being shown inserted into the range receptacle of the building.

FIGS. 10 and 11 show a kitchen appliance assembly 26.2 for building 20 which has been converted from a kitchen appliance assembly 26 having one of a slide-in and drop-in appliance to a kitchen appliance assembly 26.2 having two or more built-in kitchen appliances integrally built in to at least one of the cabinetry and the countertop. Like parts have like numbers and functions as the kitchen appliance assembly 26.1 shown in FIGS. 2 to 9 with decimal extension "0.2" replacing decimal extension "0.1" and being added for parts not previously having decimal extensions.

Kitchen appliance assembly 26.2 is the same as described for kitchen appliance assembly 26.1 shown in FIGS. 2 to 9 with the exception that it shows another possible configuration of the built-in appliances. In this example, cooktop N.2 is centrally located on countertop 42.2 and is aligned above built-in oven N+1.2. Power strip apparatus 96.2 seen in FIG. 11 is mounted within the extra spacing available when a convention combination oven and cooktop appliance, such as range 48 seen in FIG. 1, is removed and replaced with an energy efficient oven N, which tends to be more compact.

Figure 12:
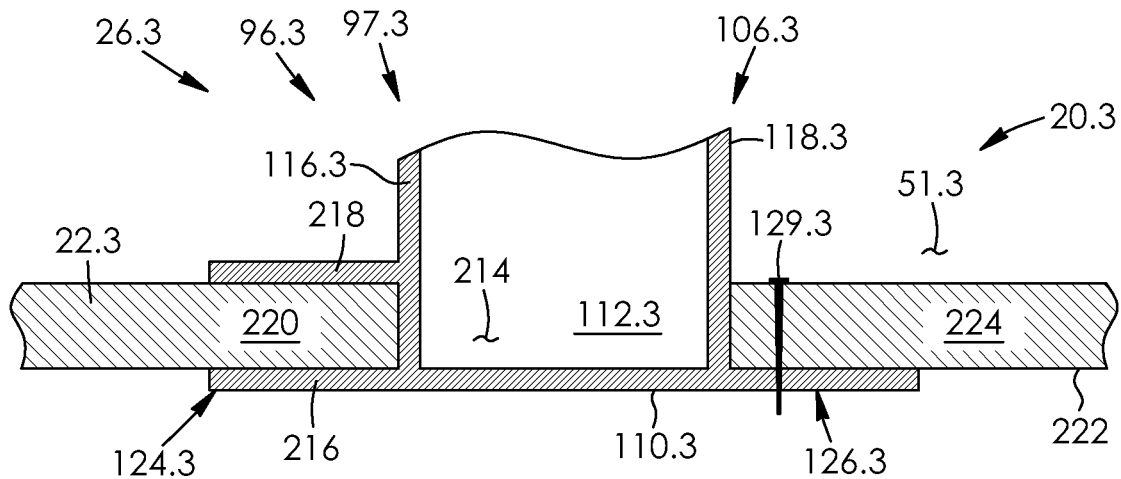
FIG. 12 is a sectional view of a power strip apparatus according to a fourth aspect, the power strip apparatus being shown fitted within an aperture of a wall of the kitchen, with a first U-shaped wall mount of the power strip apparatus fitting within a peripheral portion of the wall adjacent the aperture, with the power strip apparatus including a second wall mount abutting the rear of the wall and coupling thereto via a fastener, and with the power strip and the wall being shown in fragment.

FIG. 12 shows a kitchen appliance assembly 26.3 according to a fourth aspect for a building 20.3 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.1 shown in FIGS. 2 to 9 with decimal extension "0.3" replacing decimal extension "0.1" and being added for parts not previously having decimal extensions.

Power strip apparatus 96.3 is shown fitted within an aperture 214 of wall 22.3 of the kitchen 20.3. The power strip apparatus includes a first mounting member, in this example a first wall mount 124.3 that is U-shaped in lateral section. The wall mount includes a first portion 216 coupled to, integrally formed with, and extending outwards from side 116.3 and rear 110.3 of housing 106.3 of the power strip 97.3 in this example. The first portion of wall mount 124.3 extends parallel with the rear of the housing in this example. The first wall mount includes a second portion 218 spaced-apart from and extending parallel to the first portion 216 thereof and the rear of the housing. The wall mount is shaped to fit within peripheral portion 220 of the wall 22.3 adjacent aperture 214.

The power strip apparatus 96.3 including a second wall mount 126.3 abutting the rear 222 of the wall at a second peripheral portion 224 of the wall. The second peripheral portion of the wall 22.3 is adjacent aperture 214 and opposite the first peripheral portion 220 of the wall. The second wall mount couples to, is integrally formed with, and extends outwards from side 118.3 and rear 110.3 of housing 106.3 of the power strip 97.3 in this example. The second wall mount 126.3 extends parallel with the rear of the housing in this example. The second wall mount couples to the second peripheral portion 224 of the wall 22.3 via fastener 129.3 in this example.

Figure 13:
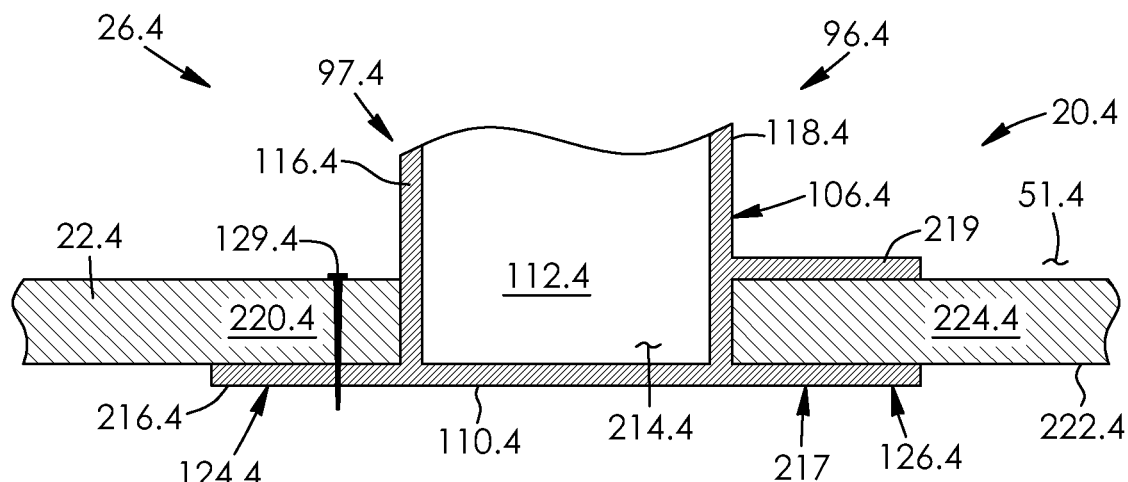
FIG. 13 is a sectional view of a power strip apparatus according to a fifth aspect, the power strip apparatus being shown fitted within an aperture of a wall of the kitchen, with a first wall mount of the power strip apparatus abutting the rear of the wall and coupling thereto via a fastener, with the power strip apparatus including a second U-shaped wall mount fitting within a peripheral portion of the wall adjacent the aperture, and with the power strip and the wall being shown in fragment.

FIG. 13 shows a kitchen appliance assembly 26.4 according to a fifth aspect for a building 20.4 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.3 shown in FIG. 12 with decimal extension "0.4" replacing decimal extension "0.3" and being added for parts not previously having decimal extensions.

Power strip apparatus 96.4 is shown fitted within aperture 214.4 of wall 22.4 of kitchen 20.4. The power strip apparatus includes a first mounting member, in this example a first wall mount 124.4 coupled to, integrally formed with, and extending outwards from side 116.4 and rear 110.4 of housing 106.4 of the power strip 97.4 in this example. The first wall mount extends parallel with the rear of the housing in this example and abuts the rear 222.4 of the wall 22.4. The first wall mount 124.4 couples to the first peripheral portion 220.4 of the wall 22.4 via fastener 129.4 in this example.

The power strip apparatus includes a second mounting member, in this example a second wall mount 126.4 that is U-shaped in lateral section. The wall mount includes a first portion 217 coupled to, integrally formed with, and extending outwards from side 118.4 and rear 110.4 of housing 106.4 of the power strip 97.4 in this example. The first portion of wall mount 126.4 extends parallel with the rear of the housing in this example. The second wall mount includes a second portion 219 spaced-apart from and extending parallel to the first portion 217 thereof and the rear of the housing. The second wall mount 126.4 is shaped to fit within peripheral portion 224.4 of the wall 22.4 adjacent aperture 214.4.

Figure 14:
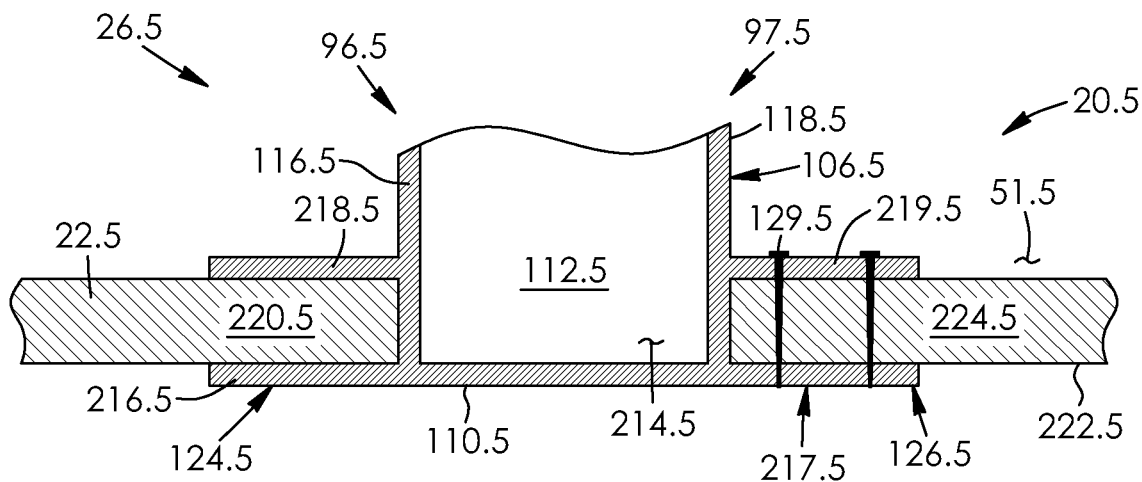
FIG. 14 is a sectional view of a power strip apparatus according to a sixth aspect, the power strip apparatus being shown fitted within an aperture of a wall of the kitchen, with a first U-shaped wall mount of the power strip apparatus fitting within a peripheral portion of the wall adjacent the aperture, a second U-shaped wall mount of the power strip apparatus fitting within an opposite peripheral portion of the wall, and with the power strip and the wall being shown in fragment.

FIG. 14 shows a kitchen appliance assembly 26.5 according to a sixth aspect for a building 20.5 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.4 shown in FIG. 13 with decimal extension "0.5" replacing decimal extension "0.4" and being added for parts not previously having decimal extensions.

Power strip apparatus 96.5 is shown fitted within aperture 214.5 of wall 22.5 of kitchen 20.5. The power strip apparatus includes a first mounting member, in this example a first wall mount 124.5 that is U-shaped in lateral section. The wall mount includes a first portion 216.5 coupled to, integrally formed with, and extending outwards from side 116.5 and rear 110.5 of housing 106.5 of the power strip 97.5 in this example. The first portion of wall mount 124.5 extends parallel with the rear of the housing in this example. The first wall mount includes a second portion 218.5 spaced-apart from and extending parallel to the first portion 216.5 thereof and the rear of the housing. The wall mount is shaped to fit within peripheral portion 220.5 of the wall 22.5 adjacent aperture 214.5.

The power strip apparatus includes a second mounting member, in this example a second wall mount 126.5 that is U-shaped in lateral section. The wall mount includes a first portion 217.5 coupled to, integrally formed with, and extending outwards from side 118.5 and rear 110.5 of housing 106.5 of the power strip 97.5 in this example. The first portion of wall mount 126.5 extends parallel with the rear of the housing in this example. The second wall mount includes a second portion 219.5 spaced-apart from and extending parallel to the first portion 217.5 thereof and the rear of the housing. The second wall mount 126.5 is shaped to fit within peripheral portion 224.5 of the wall 22.5 adjacent aperture 214.5.

At least one of the wall mounts, in this example second wall mount 126.5 of the power strip apparatus 96.5 further couples to the wall 22.5 via one or more fasteners 129.5.

Figure 15:
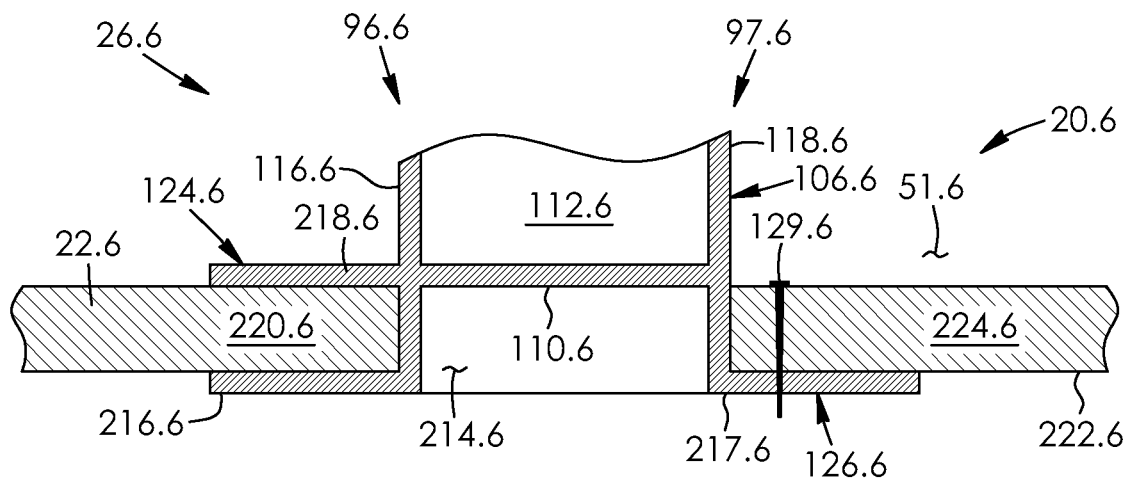
FIG. 15 is a sectional view of a power strip apparatus according to a seventh aspect, the power strip apparatus being shown fitted within an aperture of a wall of the kitchen, with a first U-shaped wall mount of the power strip apparatus fitting within a peripheral portion of the wall adjacent the aperture, with the power strip apparatus including an L-shaped second wall mount abutting the rear of the wall and coupling thereto via a fastener, and with the power strip and the wall being shown in fragment.

FIG. 15 shows a kitchen appliance assembly 26.6 according to a seventh aspect for a building 20.6 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.3 shown in FIG. 12 with decimal extension "0.6" replacing decimal extension "0.3" and being added for parts not previously having decimal extensions.

Power strip apparatus 96.6 is shown fitted within aperture 214.6 of wall 22.6 of kitchen 20.6. The power strip apparatus includes a first mounting member, in this example a first wall mount 124.6 that is U-shaped in lateral section. The wall mount includes a first portion 216.6 that is L-shaped in lateral section and coupled to, integrally formed with, and extending downwards from side 116.6 of housing 106.6 of the power strip 97.6 in this example relative to FIG. 15. The first wall mount includes a second portion 218.6 spaced-apart from and extending parallel in part to the first portion 216.6 thereof. The second portion of wall mount 124.6 extends outwards from and parallel to the rear 110.6 of the housing 106.6 in this example. The wall mount is shaped to fit within peripheral portion 220.6 of the wall 22.6 adjacent aperture 214.6.

The power strip apparatus 96.6 including a second wall mount 126.6 abutting the rear 222 of the wall at a second peripheral portion 224.6 of the wall. The second peripheral portion of the wall 22.6 is adjacent aperture 214.6 and opposite the first peripheral portion 220.6 of the wall. The second wall mount is L-shaped in lateral section and couples to, is integrally formed with, and extends downwards from side 118.6 of housing 106.6 of the power strip 97.6 in this example relative to FIG. 15. The second wall mount couples to the second peripheral portion 224.6 of the wall 22.6 via fastener 129.6 in this example. Rear 110.6 of housing 118.6 is spaced-apart from the rear 222.6 of the wall.

Figure 16:
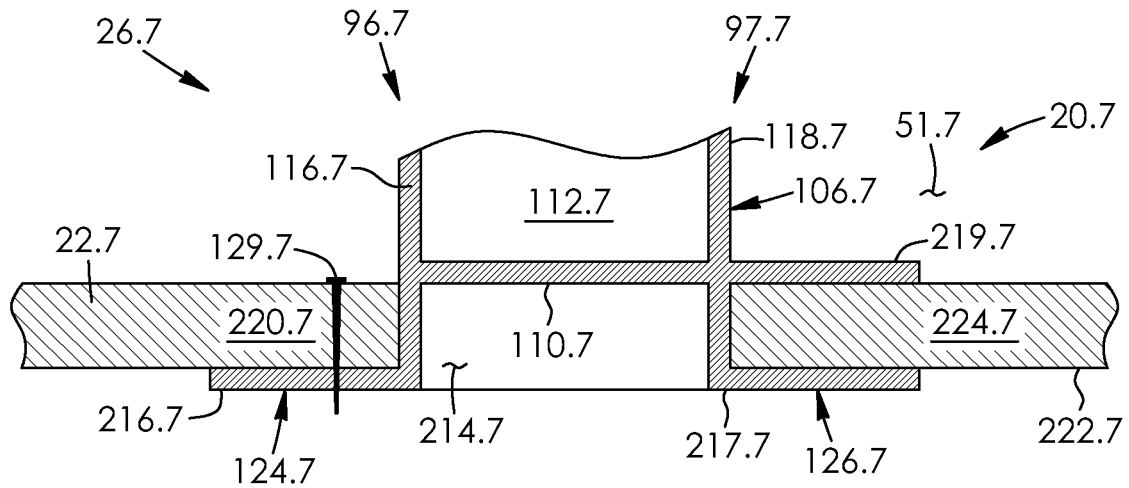
FIG. 16 is a sectional view of a power strip apparatus according to an eighth aspect, the power strip apparatus being shown fitted within an aperture of a wall of the kitchen, with an L-shaped first wall mount of the power strip apparatus abutting the rear of the wall and coupling thereto via a fastener, with the power strip apparatus including a second U-shaped wall mount fitting within a peripheral portion of the wall adjacent the aperture, and with the power strip and the wall being shown in fragment.

FIG. 16 shows a kitchen appliance assembly 26.7 according to an eighth aspect for a building 20.7 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.4 shown in FIG. 13 with decimal extension "0.7" replacing decimal extension "0.4" and being added for parts not previously having decimal extensions.

Power strip apparatus 96.7 is shown fitted within aperture 214.7 of wall 22.7 of kitchen 20.7. The power strip apparatus includes a first mounting member, in this example a first wall mount 124.7 that is L-shaped in lateral section and coupled to, integrally formed with, and extending downwards from side 116.7 of housing 106.7 of the power strip 97.7 in this example relative to FIG. 16. The first wall mount extends parallel in part with the rear of the housing in this example and abuts the rear 222.7 of the wall 22.7. The first wall mount 124.7 couples to the first peripheral portion 220.7 of the wall 22.7 via fastener 129.7 in this example.

The power strip apparatus includes a second mounting member, in this example a second wall mount 126.7 that is U-shaped in lateral section. The wall mount includes a first portion 217.7 that is L-shaped in lateral section and which couples to, is integrally formed with, and extending downwards from side 118.7 of housing 106.7 of the power strip 97.7 in this example relative to FIG. 16. The second wall mount includes a second portion 219.7 is spaced-apart from the first portion thereof and is integrally formed with, and extends outwards from and parallel to the rear 110.7 of the housing 118.7 in this example. The second wall mount 126.7 is shaped to fit within peripheral portion 224.7 of the wall 22.7 adjacent aperture 214.7. Rear 110.7 of housing 118.7 is spaced-apart from the rear 222.7 of the wall.

Figure 17:
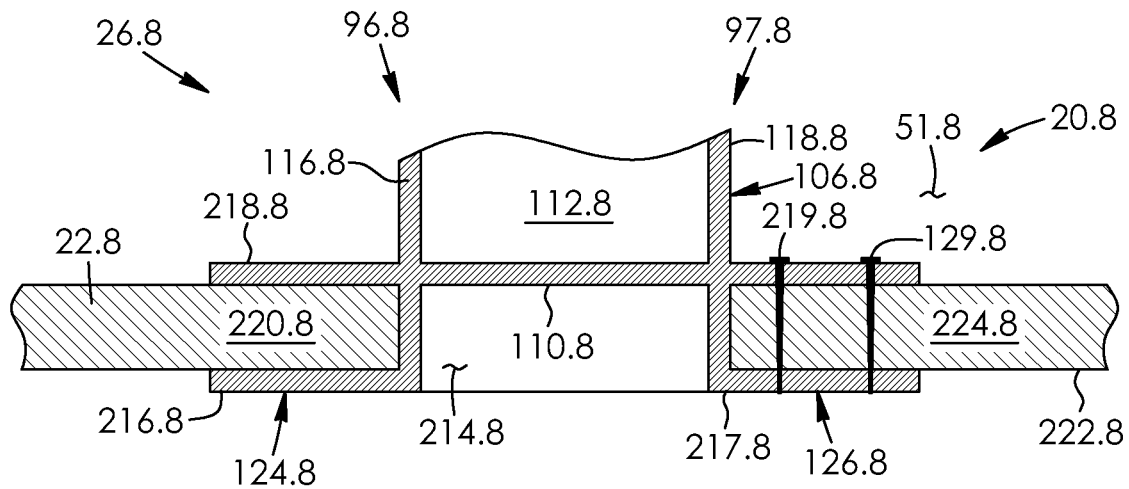
FIG. 17 is a sectional view of a power strip apparatus according to a ninth aspect, the power strip apparatus being shown fitted within an aperture of a wall of the kitchen, with a first U-shaped wall mount of the power strip apparatus fitting within a peripheral portion of the wall adjacent the aperture, a second U-shaped wall mount of the power strip apparatus fitting within an opposite peripheral portion of the wall, with the rear of the power strip aligning with the front of the wall, and with the power strip and the wall being shown in fragment.

FIG. 17 shows a kitchen appliance assembly 26.8 according to a ninth aspect for a building 20.8 which has been converted from a kitchen appliance assembly 26 having one of a slide-in and drop-in appliance to a kitchen appliance assembly having two or more built-in kitchen appliances integrally built in to at least one of the cabinetry and the countertop. Like parts have like numbers and functions as the kitchen appliance assembly 26.5 shown in FIG. 15 with decimal extension "0.8" replacing decimal extension "0.5" and being added for parts not previously having decimal extensions.

Power strip apparatus 96.8 is shown fitted within aperture 214.8 of wall 22.8 of kitchen 20.8. The power strip apparatus includes a first mounting member, in this example a first wall mount 124.8 that is U-shaped in lateral section. The wall mount includes a first portion 216.8 that is L-shaped in lateral section and coupled to, integrally formed with, and extending downwards from side 116.8 of housing 106.8 of the power strip 97.8 in this example relative to FIG. 17. The first wall mount includes a second portion 218.8 spaced-apart from the first portion thereof and is integrally formed with extends outwards from and parallel to the rear 110.8 of the housing 118.8. The first wall mount 124.8 is shaped to fit within peripheral portion 220.8 of the wall 22.8 adjacent aperture 214.8.

The power strip apparatus includes a second mounting member, in this example a second wall mount 126.8 that is U-shaped in lateral section. The wall mount includes a first portion 217.8 that is L-shaped in lateral section and coupled to, integrally formed with, and extending downwards from side 118.8 of housing 106.8 of the power strip 97.8 in this example relative to FIG. 17. The second wall mount includes a second portion 219.8 which is spaced-apart from the first portion thereof and that is integrally formed with and extends outwards from and parallel to the rear 110.8 of the housing 118.8. The second wall mount 126.8 is shaped to fit within peripheral portion 224.8 of the wall 22.8 adjacent aperture 214.8. Rear 110.8 of housing 118.8 is spaced-apart from the rear 222.8 of the wall.

At least one of the wall mounts, in this example second wall mount 126.8 of the power strip apparatus 96.8 further couples to the wall 22.8 via one or more fasteners 129.8.

Many advantages result from the structure of the present invention. The assembly and method as herein described eliminates the need to trace and change the existing wiring all the way back to the main panel, thereby saving a considerable amount of wiring which could be in the order of 50 feet, for example. The power strip apparatus 96, 96.1 enables the user to convert existing wiring by connecting the power strip apparatus to the existing range receptacle 44 of the traditional kitchen. This saves on construction materials to allow redesigns to be performed without costly conversion of existing wiring. The assembly and method of conversion may thus not require a custom installation, saves wiring costs that would otherwise be required during a custom installation. The power strip apparatus 96, 96.1 may thus enable one to convert the existing wiring of a traditional kitchen appliance assembly to accept up to three energy efficient built appliances into a 240 Vac, 50 A, 60 Hz, 1 phase outlet that is already in place from the existing wiring.

The kitchen appliance assembly 26.1, 26.2 may thus comprise a low cost solution for the problem of converting an existing kitchen appliance assembly having a single traditional high-energy appliance to a kitchen appliance assembly with a plug and play design of built-in kitchen appliances.

The kitchen assemblies 26.1, 26.2 and related method of conversion as herein described facilitate replacement of existing traditional appliances with upgraded, energy efficient modern appliances, thereby functioning to save further costs for the owner of the building. This is especially prudent for kitchen spaces that have limited room so the new space saving appliances can provide more working room to the existing kitchen footprint. The modern kitchen often requires two or three 240/10-20 Amp appliances to be used. The power strip apparatus 96, 96.1, enables the user to readily connect up to three energy-saving, built-in appliances into the existing range receptacle connection. This provides an easy appliance converter for a seamless installation.

The power strip apparatus 96, 96.1 and associated method of conversion enables the redesign of kitchen layouts to be flexible and accepts the modern energy saving appliances in the existing blueprint. The power strip apparatus 96, 96.2 as herein described may be sold as an accessory for modern kitchen appliances, where the apparatus functions to convert the traditional range receptacle connection while inhibiting costly conversions associated with the existing wiring. The power strip apparatus enhances ease of installation for remodeling, upgrading or new installation in prewired buildings.

The kitchen assemblies 26.1, 26.2 as herein described function to remove rodent-attracting cracks in the kitchen cabinetry that may exist in kitchens having slide-in or drop-in appliances. The kitchen assemblies as herein described may thus function to inhibit the presence of rodents.

The assemblies 26.1 and 26.2 as herein described may enable the user to configure more appliance positions and variations with less work while meeting relevant electrical codes and safety standards. The assemblies and methods may also improve safety compared to pigtail methods of coupling together appliances, which may be illegal and void building insurance.

The kitchen assemblies 26.1, 26.2 comprises three layers of safety: 1) each appliance incorporates a thermostat with an auto-reset feature upon the appliance reaching a maximum temperature threshold; 2) each appliance includes a thermal fuse should the thermostat fail or be broken, with the fuse melting and cutting off power to the appliance upon the current drawn through the appliance reaching a maximum current rating; and 3) the assemblies incorporate an in-line circuit breaker which shuts off power to all of the appliances upon the collective current being drawn exceeding a maximum collective current rating.

The need in the market for a built-in kitchen style is strong. Esthetics may place a built-in kitchen as the most valuable. But today that value may be further needed because now that no DDT is allowed, the presence of bugs, mice, and the like in one's kitchen may have increased faster than ever before. A slide-in or drop-in stove may facilitate the presence of crumbs and the like—food for bugs and mice, which may increase an infestation. The world is demanding a cleaner home/kitchen.

The built-in kitchen assembly as herein described, and method of installation thereof, may comprise a cost-effective solution that meets the above need and enables poison and/or traps to inhibit such infestations.

It will be appreciated that many variations are possible within the scope of the invention described herein. For example, instead of being mounted to the wall, the power strip may be walled-in and positioned within the interior structure of the wall in other embodiments. In this case, the power strip may be mounted between the wall studs or on one of the wall studs, for example.

ADDITIONAL DESCRIPTION

Examples of methods of converting a traditional kitchen to a more energy-efficient kitchen with built-in appliances, apparatuses therefor, have been described. The following clauses are offered as further description.

(1) A method of converting a kitchen having one of a slide-in and drop-in appliance electrically coupled to a range receptacle, to a kitchen having built-in appliances, the method comprising: removing said one of the slide-in and the drop-in appliance from the range receptacle; installing at least two kitchen appliances into at least one of preexisting countertops and cabinetry of the kitchen, each of the kitchen appliances including a range plug; providing a power strip apparatus comprising a range plug and a power strip having a plurality of range sockets electrically coupled to the range plug of the power strip apparatus; inserting the range plug of the power strip apparatus into the range receptacle, and inserting the range plugs of the kitchen appliances into respective ones of the range sockets of the power strip.

(2) The method of clause 1, the range receptacle electrically connecting to household power via an electrical circuit, and the method further including: configuring the kitchen appliances to be installed such that maximum combined amperage thereof is equal to or less than the amperage of that the electrical circuit can provide.

(3) The method of any preceding clause, the range receptacle electrically connecting to one of an in-line circuit breaker and a fuse, said one of the breaker and said fuse having a current rating, and wherein the method further comprises: selecting the kitchen appliances to be installed such that the collective amperage thereof is equal to or less than the current rating of said one of the breaker and the fuse.

(4) The method of any preceding clause further including: providing each of said two kitchen appliances with a safety mechanism, each said safety mechanism causing its respective one of the kitchen appliances to selectively depower upon a threshold being reached.

(5) The method of clause 4, wherein the safety mechanism is one from the group consisting of: a thermostat, an internal fuse and a circuit breaker.

(6) A power strip apparatus comprising: a flexible electrical cable having a proximal end and a distal end; a range plug electrically connected to the distal end of the electrical cable; a hollow housing coupled to the proximal end of the electrical cable; and three electrical sockets mounted to the housing, wherein the sockets electrically connect together in series with the range plug, wherein a first said socket and a second said socket align with each other and wherein a third said socket is between and offset at least in part from the first said socket and the second said socket.

(7) The apparatus of clause 6, wherein the housing has a pair of spaced-apart sides and a pair of spaced-apart ends that extend between said sides thereof, wherein the first said socket is adjacent to a first said end of the housing and is adjacent to a first said side of the housing, wherein the second said socket is adjacent to the first said end of the housing and is adjacent to a second said side of the housing, and wherein the third said socket is adjacent to a second said end of the housing and is between the sides of the housing.

(8) The apparatus of clause 7 wherein the third said socket is halfway between the sides of the housing.

(9) The apparatus of any one of clauses 6 to 7 wherein each of the sockets has a first half portion and a second half portion and wherein the first half portion of the third said socket aligns with both the second half portion of the first said socket and the second half portion of the second said socket.

(10) The apparatus of any one of clauses 6 to 9, wherein the range plug and each of the sockets includes a first electrical terminal, a second electrical terminal, a third electrical terminal and a fourth electrical terminal, the first electrical terminals electrically connecting together in series, the second electrical terminals electrically connecting together in series, the third electrical terminals electrically connecting together in series, and the fourth electrical terminals electrically connecting together in series.

(11) The apparatus of any one of clauses 6 to 10 wherein each of the electrical sockets has a cross-sectional diameter and wherein adjacent ones of the sockets are spaced from each other by a distance equal to or greater than one half of said diameter.

(12) The apparatus of any one of clauses 6 to 11 wherein the housing has a removable front to which the electrical sockets are mounted.

(13) The apparatus of any one of clauses 6 to 12 wherein each of the electrical sockets has a cross-sectional diameter and wherein the housing has a front and a rear, the front of the housing being spaced-apart from the rear of the housing by a distance in the range of equal to or greater than said diameter and equal to or less than two times said diameter.

(14) The apparatus of any one of clauses 6 to 13 wherein the housing has a pair of spaced-apart sides, a pair of spaced-apart ends which extend between said sides, and an open top defined by said ends and said sides, and wherein the housing includes a removable cover shaped to extend about said top, the cover including a planar member to which the electrical sockets mount and the cover including a peripheral portion which couples to and extends outwards from the planar member of the lid, the peripheral portion of the cover extending about and abutting the sides and the ends of the housing.

(15) The apparatus of clause 14 further including one or more fasteners which selectively extend through the peripheral portion of the cover and at least one of the sides and the ends of the housing, the one or more fasteners coupling the cover to the sides and the ends of the housing thereby.

(16) The apparatus of clause 14, wherein the housing is a hollow rectangular prism in shape and wherein the apparatus further includes a plurality of fasteners which selectively extend through the peripheral portion of the cover and into the ends of the housing at locations adjacent to the sides of housing, the fasteners coupling the cover to the sides and the ends of the housing thereby.

(17) A power strip apparatus comprising: a flexible electrical cable having a proximal end and a distal end; a range plug electrically connected to the distal end of the electrical cable; a hollow housing coupled to the proximal end of the electrical cable; a plurality of electrical sockets mounted to the housing, the sockets electrically connecting together in series with the range plug; and a metal, flexible cable protector within which the cable extends, the cable protector extending between and coupling to the housing and the range plug.

(18) The apparatus of clause 17 wherein the housing has a front and a rear, the electrical sockets mounting to the front of the housing and the cable protector mounting to the housing adjacent to the rear of the housing.

(19) The apparatus of any one of clauses 17 to 18 wherein the housing has a pair of spaced-apart sides, the cable protector mounting to and extending from one of said sides of the housing, and wherein the apparatus further includes a pair of wall mounting plates coupled to and extending outwards from said sides of the housing.

(20) A kitchen appliance assembly including the power strip apparatus of any one of clauses 17 to 19, the assembly including: a wall to which the power strip apparatus is mounted; cabinetry and countertops; at least two kitchen appliances built in to at least one of the cabinetry and the countertop, each of the kitchen appliances including a range plug, the range plugs of the kitchen appliances being inserted into the range sockets of the power strip apparatus; and a range receptacle electrically coupled to an electrical power supply, the range plug of the power strip apparatus being inserted within a range receptacle.

In a further variant, the power strip apparatus may comprise cable free of a cable protector. It will be understood by someone skilled in the art that many of the details provided above are by way of example only and are not intended to limit the scope of the invention which is to be determined with reference to at least the following claims.

What is claimed is:

1. A method of creating a kitchen with built-in kitchen appliances, the method comprising:

removing an existing slide-in or drop-in range from a space of the kitchen having a range receptacle;

installing a power strip apparatus including a range plug coupled to the range receptacle of the kitchen and a plurality of range sockets coupled to the range plug;

installing two or more said built-in kitchen appliances in the kitchen, wherein the step of installing the two or more said built-in kitchen appliances includes both installing cabinetry and at least one said built-in kitchen appliance within the now open space of the kitchen and enclosing the power strip apparatus via one or more of the cabinetry and the at least one said built-in kitchen appliance; and coupling sockets of the two or more said built-in kitchen appliances to respective said range sockets of the power strip apparatus, with power being provided to the two or more said built-in kitchen appliances thereby.

2. The method as claimed in claim 1 further including within installing the power strip apparatus step:

positioning the power strip apparatus within the now open space of the kitchen;

mounting the power strip apparatus in place; and enclosing the power strip apparatus to inhibit access thereto.

3. The method as claimed in claim 1 further including within the installing the power strip apparatus step: mounting the power strip apparatus to a wall of the kitchen facing the now open space.

4. The method as claimed in claim 1 further including within the installing the power strip apparatus step: mounting the power strip apparatus adjacent to the range receptacle of the kitchen.

5. The method as claimed in claim 1, wherein the range receptacle of the kitchen connects to an electrical circuit, and wherein the method further includes:

selecting the two or more said built-in kitchen appliances to be installed such that the collective amperage thereof is equal to or less than the current rating of the electrical circuit.

6. The method as claimed in claim 1, the range receptacle electrically connecting to household power via an electrical circuit, and the method further including:

configuring the two or more said built-in kitchen appliances to be installed such that a maximum combined amperage thereof is equal to or less than the amperage of that the electrical circuit can provide.

7. The method as claimed in claim 1, the range receptacle electrically connecting to one of an in-line circuit breaker and a fuse, said one of the in-line circuit breaker and the fuse having a current rating, and wherein the method further comprises:

selecting the two or more said built-in kitchen appliances to be installed such that the collective amperage thereof is equal to or less than the current rating of the one of the in-line circuit breaker and the fuse.

8. The method as claimed in claim 1 further including:

providing each of the two or more said built-in kitchen appliances with a safety mechanism, each said safety mechanism causing a respective one of the two or more said built-in kitchen appliances thereof to selectively depower upon a threshold being reached, with each said safety mechanism being one or more of a thermostat, an internal fuse or a circuit breaker.

9. The method as claimed in claim 1 further including:

enclosing wiring of the power strip apparatus within a hollow housing made of metal.

10. The method as claimed in claim 1 further including:

coupling together the range plug of the power strip apparatus and the range sockets of the power strip apparatus via a flexible electrical cable; and enclosing the flexible electrical cable at least in part with a flexible cable protector made of metal.

11. The method as claimed in claim 1, further including:

providing the power strip apparatus with a housing made of metal and to which the range sockets thereof mount, providing the power strip apparatus with a flexible electrical cable mounted to the housing and coupling the range sockets thereof to the range plug thereof, and providing the power strip apparatus with a flexible cable protector made of metal and within which the flexible electrical cable is at least partially enclosed.

12. A method of creating a more energy-efficient kitchen in a cost-effective manner, the method comprising:

removing a slide-in/drop-in appliance from a range receptacle of the kitchen, the range receptacle connecting to an electrical circuit;

selecting two or more energy efficient kitchen appliances and installing the two or more energy-efficient kitchen appliances in the kitchen; and connecting the two or more energy efficient kitchen appliances to the electrical circuit via a power strip apparatus with a plurality of range sockets to which range plugs of the two or more energy efficient kitchen appliances respectively couple, the power strip apparatus including a range plug via which the range sockets thereof couple to the range receptacle of the kitchen;

whereby the two or more energy efficient kitchen appliances are selected such that the maximum combined amperage draws thereof are equal to or less than the amperage at which the electrical circuit is rated.

13. The method as claimed in claim 12, further including:

mounting the power strip apparatus adjacent the range receptacle; and enclosing the power strip apparatus via cabinetry and one said energy-efficient kitchen appliance or via two said energy-efficient kitchen appliances, with access to the power strip apparatus being inhibited thereby.

14. The method as claimed in claim 12 further including:

enclosing wiring of the power strip apparatus within a hollow housing made of metal.

15. The method as claimed in claim 12 further including:

coupling together the range plug of the power strip apparatus and the range sockets of the power strip apparatus via a flexible electrical cable; and enclosing the flexible electrical cable at least in part with a flexible cable protector made of metal.

16. A power strip apparatus via which a plurality of built-in kitchen appliances couple to a range receptacle of a kitchen, the power strip apparatus comprising:

a flexible electrical cable having a proximal end and a distal end;

a range plug electrically connected to the distal end of the flexible electrical cable and configured to couple with the range receptacle of the kitchen;

a hollow housing coupled to the proximal end of the flexible electrical cable;

a plurality of electrical sockets mounted to the housing, the electrical sockets electrically connecting with the range plug and being configured to receive plugs from respective ones of the built-in kitchen appliances; and a flexible cable protector within which the flexible electrical cable extends, the flexible cable protector extending between and coupling to the housing and the range plug;

wherein the power strip apparatus is configured to be enclosed by either (i) cabinetry and at least one of said built-in kitchen appliances or (ii) two or more said built-in kitchen appliances, with access thereto thereby being inhibited.

17. The apparatus as claimed in claim 16 further including a pair of wall mounts coupling to and extending outwards from the housing, with at least one said wall mount being u-shaped and configured to receive a portion of a wall of the kitchen therewithin.

18. The apparatus as claimed in claim 17, wherein the housing is made of metal and the cable protector is made of metal.

19. In combination, two or more built-in kitchen appliances, cabinetry, and the power strip apparatus as claimed in claim 17.

20. The apparatus as claimed in claim 16 further including a pair of wall mounts coupling to and extending outwards from the housing, with each said wall mount being u-shaped and configured to receive a respective portion of a wall of the kitchen therewithin.

\* \* \* \* \*